United States Patent
Logan et al.

(10) Patent No.: US 11,719,948 B2
(45) Date of Patent: Aug. 8, 2023

(54) BEAM PARAMETER PRODUCT (BPP) CONTROL BY VARYING FIBER-TO-FIBER ANGLE

(71) Applicant: nLIGHT, Inc., Vancouver, WA (US)

(72) Inventors: David Logan, Vancouver, WA (US); Ryan Hawke, Vancouver, WA (US); David R. Balsley, Portland, OR (US); Ron Stevens, Vancouver, WA (US)

(73) Assignee: nLIGHT, Inc., Vancouver, WA (US)

( * ) Notice: Subject to any disclaimer, the term of this patent is extended or adjusted under 35 U.S.C. 154(b) by 234 days.

(21) Appl. No.: 16/987,054

(22) Filed: Aug. 6, 2020

(65) Prior Publication Data
US 2020/0363645 A1 Nov. 19, 2020

Related U.S. Application Data

(62) Division of application No. 15/276,589, filed on Sep. 26, 2016, now Pat. No. 10,768,433.

(60) Provisional application No. 62/232,379, filed on Sep. 24, 2015.

(51) Int. Cl.
G02B 6/255 (2006.01)
G02B 27/09 (2006.01)
H01S 3/067 (2006.01)

(52) U.S. Cl.
CPC ....... *G02B 27/0994* (2013.01); *G02B 6/2555* (2013.01); *H01S 3/06783* (2013.01); *G02B 6/2551* (2013.01); *G02B 6/2553* (2013.01)

(58) Field of Classification Search
CPC .......... G02B 27/0994; G02B 6/2555; G02B 6/2553; G02B 6/2551; H01S 3/06783

USPC ................ 385/38, 42–43, 76–77, 85, 96–99
See application file for complete search history.

(56) References Cited

U.S. PATENT DOCUMENTS

| 4,138,190 A | 2/1979 | Bryngdahl |
| 4,252,403 A | 2/1981 | Salisbury |
| 4,266,851 A | 5/1981 | Salisbury |
| 4,475,027 A | 10/1984 | Pressley |
| 4,475,789 A | 10/1984 | Kahn |

(Continued)

FOREIGN PATENT DOCUMENTS

| CN | 102782540 | 11/2002 |
| CN | 1584644 | 2/2005 |

(Continued)

OTHER PUBLICATIONS

"ARM," Coherent, available at: http://www.corelase.fi/products/arm/, 6 pages, retrieved May 26, 2017.

(Continued)

*Primary Examiner* — Kaveh C Kianni
*Assistant Examiner* — Hung Q Lam
(74) *Attorney, Agent, or Firm* — Klarquist Sparkman, LLP

(57) ABSTRACT

An apparatus includes a laser system that includes a first fiber having an output end and situated to propagate a first laser beam with a first beam parameter product (bpp) and a second fiber having an input end spliced to the output end of the first fiber at a fiber splice so as to receive the first laser beam and to form a second laser beam having a second bpp that is greater than the first bpp, wherein the output end of the first fiber and the input end of the second fiber are spliced at a tilt angle so as to increase the first bpp to the second bpp.

20 Claims, 13 Drawing Sheets

(56) References Cited

U.S. PATENT DOCUMENTS

| | | | |
|---|---|---|---|
| 4,978,201 A * | 12/1990 | Yamada | G01B 11/272 385/96 |
| 4,998,797 A | 3/1991 | van den Bergh et al. | |
| 5,082,349 A | 1/1992 | Cordova-Plaza et al. | |
| 5,153,773 A | 10/1992 | Muraki et al. | |
| 5,319,195 A | 6/1994 | Jones et al. | |
| 5,463,497 A | 10/1995 | Muraki et al. | |
| 5,475,415 A | 12/1995 | Noethen | |
| 5,745,284 A | 4/1998 | Goldberg et al. | |
| 5,818,630 A | 10/1998 | Fermann et al. | |
| 5,864,430 A | 1/1999 | Dickey et al. | |
| 5,903,696 A | 5/1999 | Krivoshlykov | |
| 5,909,306 A | 6/1999 | Goldberg et al. | |
| 5,986,807 A | 11/1999 | Fork | |
| 5,999,548 A | 12/1999 | Mori et al. | |
| 6,072,184 A | 6/2000 | Okino et al. | |
| 6,132,104 A | 10/2000 | Bliss et al. | |
| 6,265,710 B1 | 7/2001 | Miller et al. | |
| 6,330,382 B1 | 12/2001 | Harshbarger et al. | |
| 6,417,963 B1 | 7/2002 | Ohishi et al. | |
| 6,433,301 B1 | 8/2002 | Dunsky et al. | |
| 6,434,177 B1 | 8/2002 | Jurgensen | |
| 6,434,302 B1 | 8/2002 | Fidric et al. | |
| 6,483,973 B1 | 11/2002 | Mazzarese et al. | |
| 6,496,301 B1 | 12/2002 | Koplow et al. | |
| 6,542,665 B2 | 4/2003 | Reed et al. | |
| 6,556,340 B1 | 4/2003 | Wysocki et al. | |
| 6,639,177 B2 | 10/2003 | Ehrmann et al. | |
| 6,671,293 B2 | 12/2003 | Kopp et al. | |
| 6,711,918 B1 | 3/2004 | Kliner et al. | |
| 6,724,528 B2 | 4/2004 | Koplow et al. | |
| 6,772,611 B2 | 8/2004 | Kliner et al. | |
| 6,777,645 B2 | 8/2004 | Ehrmann et al. | |
| 6,801,550 B1 | 10/2004 | Snell et al. | |
| 6,825,974 B2 | 11/2004 | Kliner et al. | |
| 6,839,163 B1 | 1/2005 | Jakobson et al. | |
| 6,882,786 B1 | 4/2005 | Kliner et al. | |
| 6,895,154 B2 | 5/2005 | Johnson et al. | |
| 6,917,742 B2 | 7/2005 | Po | |
| 6,941,053 B2 | 9/2005 | Lauzon et al. | |
| 6,963,062 B2 | 11/2005 | Cyr et al. | |
| 6,989,508 B2 | 1/2006 | Ehrmann et al. | |
| 7,068,900 B2 | 6/2006 | Croteau et al. | |
| 7,079,566 B2 | 7/2006 | Kido et al. | |
| 7,099,533 B1 | 8/2006 | Chenard | |
| 7,116,887 B2 | 10/2006 | Farroni et al. | |
| 7,146,073 B2 | 12/2006 | Wan | |
| 7,148,447 B2 | 12/2006 | Ehrmann et al. | |
| 7,151,787 B2 | 12/2006 | Kulp et al. | |
| 7,157,661 B2 | 1/2007 | Amako | |
| 7,170,913 B2 | 1/2007 | Araujo et al. | |
| 7,184,630 B2 | 2/2007 | Kwon et al. | |
| 7,235,150 B2 | 6/2007 | Bischel et al. | |
| 7,257,293 B1 | 8/2007 | Fini et al. | |
| 7,317,857 B2 | 1/2008 | Manyam et al. | |
| 7,359,604 B2 | 4/2008 | Po | |
| 7,373,070 B2 | 5/2008 | Wetter et al. | |
| 7,382,389 B2 | 6/2008 | Cordingley et al. | |
| 7,394,476 B2 | 7/2008 | Cordingley et al. | |
| 7,421,175 B2 | 9/2008 | Varnham | |
| 7,527,977 B1 | 5/2009 | Fruetel et al. | |
| 7,537,395 B2 | 5/2009 | Savage-Leuchs | |
| 7,592,568 B2 | 9/2009 | Varnham et al. | |
| 7,593,435 B2 | 9/2009 | Gapontsev et al. | |
| 7,748,913 B2 | 7/2010 | Oba | |
| 7,764,854 B2 | 7/2010 | Fini | |
| 7,783,149 B2 | 8/2010 | Fini | |
| 7,835,608 B2 | 11/2010 | Minelly et al. | |
| 7,839,901 B2 | 11/2010 | Meleshkevich et al. | |
| 7,876,495 B1 | 1/2011 | Minelly | |
| 7,880,961 B1 | 2/2011 | Feve et al. | |
| 7,920,767 B2 | 4/2011 | Fini | |
| 7,924,500 B1 | 4/2011 | Minelly | |
| 7,925,125 B2 | 4/2011 | Cyr et al. | |
| 7,955,905 B2 | 6/2011 | Cordingley et al. | |
| 7,955,906 B2 | 6/2011 | Cordingley et al. | |
| 8,027,555 B1 | 9/2011 | Kliner et al. | |
| 8,217,304 B2 | 7/2012 | Cordingley et al. | |
| 8,243,764 B2 | 8/2012 | Tucker et al. | |
| 8,270,441 B2 | 9/2012 | Rogers et al. | |
| 8,270,445 B2 | 9/2012 | Morasse et al. | |
| 8,278,591 B2 | 10/2012 | Chouf et al. | |
| 8,288,683 B2 | 10/2012 | Jennings et al. | |
| 8,317,413 B2 | 11/2012 | Fisher et al. | |
| 8,362,391 B2 | 1/2013 | Partlo et al. | |
| 8,395,084 B2 | 3/2013 | Tanaka | |
| 8,509,577 B2 | 8/2013 | Liu | |
| 8,526,110 B1 | 9/2013 | Honea et al. | |
| 8,542,145 B2 | 9/2013 | Galati | |
| 8,593,725 B2 | 11/2013 | Kliner et al. | |
| 8,711,471 B2 | 4/2014 | Liu et al. | |
| 8,728,591 B2 | 5/2014 | Inada et al. | |
| 8,755,660 B1 | 6/2014 | Minelly | |
| 8,781,269 B2 | 7/2014 | Huber et al. | |
| 8,809,734 B2 | 8/2014 | Cordingley et al. | |
| 8,835,804 B2 | 9/2014 | Farmer et al. | |
| 8,934,742 B2 | 1/2015 | Voss et al. | |
| 8,947,768 B2 | 2/2015 | Kliner et al. | |
| 8,948,218 B2 | 2/2015 | Gapontsev et al. | |
| 8,953,914 B2 | 2/2015 | Genier | |
| 9,014,220 B2 | 4/2015 | Minelly et al. | |
| 9,136,663 B2 | 9/2015 | Taya | |
| 9,140,873 B2 | 9/2015 | Minelly | |
| 9,146,353 B2 * | 9/2015 | Kawanishi | G02B 6/3616 |
| 9,158,066 B2 | 10/2015 | Fini et al. | |
| 9,207,395 B2 | 12/2015 | Fini et al. | |
| 9,217,825 B2 | 12/2015 | Ye et al. | |
| 9,250,390 B2 | 2/2016 | Muendel et al. | |
| 9,310,560 B2 | 4/2016 | Chann et al. | |
| 9,322,989 B2 | 4/2016 | Fini et al. | |
| 9,325,151 B1 | 4/2016 | Fini et al. | |
| 9,339,890 B2 | 5/2016 | Woods et al. | |
| 9,366,887 B2 | 6/2016 | Tayebati et al. | |
| 9,397,466 B2 | 7/2016 | McComb et al. | |
| 9,431,786 B2 | 8/2016 | Savage-Leuchs | |
| 9,442,252 B2 | 9/2016 | Genier | |
| 9,507,084 B2 | 11/2016 | Fini et al. | |
| 9,547,121 B2 | 1/2017 | Hou et al. | |
| 9,634,462 B2 | 4/2017 | Kliner et al. | |
| 9,823,422 B2 | 11/2017 | Muendel et al. | |
| 9,837,783 B2 | 12/2017 | Kliner et al. | |
| 10,295,845 B2 | 5/2019 | Kliner et al. | |
| 2002/0146202 A1 | 10/2002 | Reed et al. | |
| 2002/0168139 A1 | 11/2002 | Clarkson et al. | |
| 2003/0095578 A1 | 5/2003 | Kopp et al. | |
| 2003/0118305 A1 | 6/2003 | Reed et al. | |
| 2003/0152342 A1 | 8/2003 | Wang et al. | |
| 2003/0219208 A1 | 11/2003 | Kwon et al. | |
| 2004/0208464 A1 | 10/2004 | Po | |
| 2005/0002607 A1 | 1/2005 | Neuhaus et al. | |
| 2005/0041697 A1 | 2/2005 | Seifert et al. | |
| 2005/0041939 A1 * | 2/2005 | Saito | G02B 6/2551 385/96 |
| 2005/0185892 A1 | 8/2005 | Kwon et al. | |
| 2005/0265678 A1 | 12/2005 | Manyam et al. | |
| 2006/0024001 A1 | 2/2006 | Kobayashi | |
| 2006/0067632 A1 | 3/2006 | Broeng et al. | |
| 2006/0219673 A1 | 10/2006 | Varnham et al. | |
| 2006/0291788 A1 | 12/2006 | Po | |
| 2007/0104438 A1 | 5/2007 | Varnham | |
| 2007/0147751 A1 | 6/2007 | Fini | |
| 2007/0178674 A1 | 8/2007 | Imai et al. | |
| 2007/0195850 A1 | 8/2007 | Schluter et al. | |
| 2009/0034059 A1 | 2/2009 | Fini | |
| 2009/0059353 A1 | 3/2009 | Fini | |
| 2009/0080835 A1 | 3/2009 | Frith | |
| 2009/0152247 A1 | 6/2009 | Jennings et al. | |
| 2009/0175301 A1 | 7/2009 | Li et al. | |
| 2010/0067013 A1 | 3/2010 | Howieson et al. | |
| 2010/0067860 A1 | 3/2010 | Ikeda et al. | |
| 2010/0129029 A1 | 5/2010 | Westbrook | |
| 2010/0150186 A1 | 6/2010 | Mizuuchi | |
| 2011/0091155 A1 | 4/2011 | Yilmaz et al. | |
| 2011/0134512 A1 | 6/2011 | Ahn et al. | |

(56) References Cited

U.S. PATENT DOCUMENTS

| | | | |
|---|---|---|---|
| 2011/0163077 A1 | 7/2011 | Partlo et al. | |
| 2011/0248005 A1 | 10/2011 | Briand et al. | |
| 2011/0253668 A1 | 10/2011 | Winoto et al. | |
| 2011/0305256 A1 | 12/2011 | Chann | |
| 2012/0002919 A1 | 1/2012 | Liu | |
| 2012/0051692 A1 | 3/2012 | Seo | |
| 2012/0128294 A1 | 5/2012 | Voss et al. | |
| 2012/0168411 A1 | 7/2012 | Farmer et al. | |
| 2012/0219026 A1 | 8/2012 | Saracco et al. | |
| 2012/0250705 A1* | 10/2012 | Tong ............ | H01S 3/06704 156/64 |
| 2012/0262781 A1 | 10/2012 | Price et al. | |
| 2013/0028276 A1 | 1/2013 | Minelly et al. | |
| 2013/0038923 A1 | 2/2013 | Jespersen et al. | |
| 2013/0087694 A1 | 4/2013 | Creeden et al. | |
| 2013/0148925 A1 | 6/2013 | Muendel et al. | |
| 2013/0223792 A1 | 8/2013 | Huber et al. | |
| 2013/0251324 A1 | 9/2013 | Fini et al. | |
| 2013/0343703 A1 | 12/2013 | Genier | |
| 2014/0086526 A1 | 3/2014 | Starodubov et al. | |
| 2014/0177038 A1 | 6/2014 | Rrataj et al. | |
| 2014/0178023 A1 | 6/2014 | Oh et al. | |
| 2014/0233900 A1 | 8/2014 | Hugonnot et al. | |
| 2014/0241385 A1 | 8/2014 | Fomin et al. | |
| 2014/0268310 A1 | 9/2014 | Ye et al. | |
| 2014/0334788 A1 | 11/2014 | Fini et al. | |
| 2015/0049987 A1 | 2/2015 | Grasso et al. | |
| 2015/0104139 A1 | 4/2015 | Brunet et al. | |
| 2015/0125114 A1 | 5/2015 | Genier | |
| 2015/0125115 A1 | 5/2015 | Genier | |
| 2015/0138630 A1 | 5/2015 | Honea et al. | |
| 2015/0241632 A1 | 8/2015 | Chann et al. | |
| 2015/0293300 A1 | 10/2015 | Fini et al. | |
| 2015/0293306 A1 | 10/2015 | Huber et al. | |
| 2015/0316716 A1 | 11/2015 | Fini et al. | |
| 2015/0331205 A1 | 11/2015 | Tayebati et al. | |
| 2015/0349481 A1 | 12/2015 | Kliner | |
| 2015/0378184 A1 | 12/2015 | Tayebati et al. | |
| 2016/0013607 A1 | 1/2016 | McComb et al. | |
| 2016/0097903 A1 | 4/2016 | Li et al. | |
| 2016/0104995 A1 | 4/2016 | Savage-Leuchs | |
| 2016/0116679 A1 | 4/2016 | Muendel et al. | |
| 2016/0218476 A1 | 7/2016 | Kliner et al. | |
| 2016/0285227 A1 | 9/2016 | Farrow et al. | |
| 2016/0320565 A1 | 11/2016 | Brown et al. | |
| 2016/0320685 A1 | 11/2016 | Tayebati et al. | |
| 2017/0003461 A1 | 1/2017 | Tayebati et al. | |
| 2017/0090119 A1 | 3/2017 | Logan et al. | |
| 2017/0110845 A1 | 4/2017 | Hou et al. | |
| 2017/0162999 A1 | 6/2017 | Saracco et al. | |
| 2017/0271837 A1 | 9/2017 | Hemenway et al. | |
| 2017/0336580 A1 | 11/2017 | Tayebati et al. | |
| 2018/0088357 A1 | 3/2018 | Kliner et al. | |
| 2018/0088358 A1 | 3/2018 | Kliner et al. | |
| 2018/0154484 A1 | 6/2018 | Hall | |
| 2018/0203185 A1 | 7/2018 | Farrow et al. | |
| 2018/0215650 A1 | 8/2018 | Brown et al. | |
| 2018/0217409 A1 | 8/2018 | Kliner et al. | |
| 2019/0258091 A1 | 8/2019 | Kliner et al. | |

FOREIGN PATENT DOCUMENTS

| | | |
|---|---|---|
| CN | 1327254 | 7/2007 |
| CN | 101435918 | 5/2009 |
| CN | 102844942 | 12/2012 |
| CN | 104136952 | 11/2014 |
| CN | 104169763 | 11/2014 |
| DE | 4200587 | 4/1993 |
| DE | 10321102 | 12/2004 |
| EP | 1266259 | 5/2011 |
| WO | WO 2004/027477 | 4/2004 |
| WO | WO 2008/053915 | 5/2008 |
| WO | WO 2013/090236 | 6/2013 |
| WO | WO 2017/008022 | 1/2017 |
| WO | WO 2017/136831 | 8/2017 |

OTHER PUBLICATIONS

"Canunda, Application Note," CAILabs, available at: www.cailabs.com, 16 pages (Jun. 10, 2015).

"Canunda, Application Note: Flexible high-power laser beam shaping," CAILabs, available at: www.cailabs.com, 22 pages, date unknown.

"Efficient and Simple Precision, Laser Processing Head PDT-B," Highyag, 6 pages, (Jan. 2010).

"ENSIS Series," Amada America, Inc., available at: http://www.amada.com/america/ensis-3015-aj, 2 pages, retrieved May 26, 2017.

"EX-F Series," MC Machinery Systems, Inc., available at: https://www.mcmachinery.com/products-and-solutions/ex-f-series/, 2 pages, retrieved May 26, 2017.

"How to Select a Beamsplitter," IDEX—Optics & Photonics Marketplace, available at: https://www.cvilaseroptics.com/file/general/beamSplitters.pdf, 5 pages (Jan. 8, 2014).

"Laser cutting machines," TRUMPF, available at: http://www.us.trumpf.com/en/products/machine-tools/products/2d-laser-cutting/innovative-technology/brightline.html, 9 pages, retrieved May 26, 2017.

"Lasers & Fibers," NKT Photonics, available at: https://www.nktphotonics.com/lasers-fibers/technology/photonic-crystal-fibers/, 4 pages, retrieved Feb. 13, 2018.

"Triple Clad Ytterbium-Doped Polarization Maintaining Fibers," nuFERN Driven to Light Specifications, 1 page (Jan. 2006).

Adelman et al., "Measurement of Relative State-to-State Rate Constants for the Reaction D+H$_2$(v, j)→HD(v', j')+H," *J. Chem. Phys.*, 97:7323-7341 (Nov. 15, 1992).

Advisory Action from U.S. Appl. No. 15/607,410, dated Sep. 24, 2018, 6 pages.

Alfano et al., "Photodissociation and Recombination Dynamics of I$_2^-$ in Solution," *Ultrafast Phenomena VIII*, (Springer-Verlag, New York), pp. 653-655 (1993).

Applicant-Initiated Interview Summary from U.S. Appl. No. 15/607,399, dated May 25, 2018, 3 pages.

Applicant-Initiated Interview Summary from U.S. Appl. No. 15/607,399, dated Jul. 27, 2018, 9 pages.

Applicant-Initiated Interview Summary from U.S. Appl. No. 15/607,410, dated May 25, 2018, 3 pages.

Applicant-Initiated Interview Summary from U.S. Appl. No. 15/607,410, dated Jul. 24, 2018, 9 pages.

Applicant-Initiated Interview Summary from U.S. Appl. No. 15/607,411, dated Jan. 17, 2018, 2 pages.

Applicant-Initiated Interview Summary from U.S. Appl. No. 15/607,411, dated Sep. 12, 2018, 17 pages.

Applicant-Initiated Interview Summary from U.S. Appl. No. 15/607,399, dated Dec. 26, 2018, 7 pages.

Bernasconi et al., "Kinetics of Ionization of Nitromethane and Phenylnitromethane by Amines and Carboxylate Ions in Me$_2$SO-Water Mixtures. Evidence of Ammonium Ion-Nitronate Ion Hydrogen Bonded Complex Formation in Me$_2$SO-Rich Solvent Mixtures," *J. Org. Chem.*, 53:3342-3351, 10 pages (1988).

Blake et al., "The H+D$_2$ Reaction: HD(v=1, J) and HD(v=2, J) Distributions at a Collision Energy of 1.3 eV," *Chem. Phys. Lett.*, 153:365-370, 6 pages (Dec. 23, 1988).

Daniel et al., "Novel technique for mode selection in a large-mode-area fiber laser," Conference on Lasers and Electro-Optics 2010, OSA Technical Digest (CD) (Optical Society of America), paper CWC5, 2 pages (2010).

Daniel et al., "Novel technique for mode selection in a multimode fiber laser," Optics Express, 19:12434-12439, 6 pages (Jun. 20, 2011).

Di Teodoro et al., "Diffraction-Limited, 300-kW Peak-Power Pulses from a Coiled Multimode Fiber Amplifier," *Optics Letters*, 27:518-520, 3 pages (2002).

Di Teodoro et al., "Diffraction-limited, 300-kW-peak-power Pulses from a Yb-doped Fiber Amplifier," *Conference on Lasers and*

(56) References Cited

OTHER PUBLICATIONS

*Electro-Optics*, OSA Technical Digest (Optical Society of America, Washington, DC), p. 592-593, 2 pages (2002).
Di Teodoro et al., "High-peak-power pulsed fiber sources," *Proc. of SPIE*, 5448:561-571 (2004).
Examiner-Initiated Interview Summary from U.S. Appl. No. 15/607,410, dated Jan. 31, 2019, 2 pages.
Extended European Search Report for European Patent Application No. 16849882.2, dated Apr. 23, 2019 (8 pages).
Farley et al., "Optical fiber designs for beam shaping," Proc. of SPIE, Fiber Lasers XI: Technology, Systems, and Applications, 8961:89612U-1-89612U-10 (2014).
Farrow et al., "Bend-Loss Filtered, Large-Mode-Area Fiber Amplifiers: Experiments and Modeling," Proceedings of the Solid State and Diode Laser Technology Review (Directed Energy Professional Society), p. 9, 5 pages (2006).
Farrow et al., "Compact Fiber Lasers for Efficient High-Power Generation," *Proc. of SPIE*, 6287:62870C-1-62870C-6 (2006).
Farrow et al., "Design of Refractive-Index and Rare-Earth-Dopant Distributions for Large-Mode-Area Fibers Used in Coiled High-Power Amplifiers," *Proc. of SPIE*, 6453:64531C-1-64531C-11 (2007).
Farrow et al., "High-Peak-Power (>1.2 MW) Pulsed Fiber Amplifier," *Proc. of the SPIE*, 6102:61020L-1-61020L-11 (2006).
Farrow et al., "Numerical Modeling of Self-Focusing Beams in Fiber Amplifiers," *Proc. of the SPIE*, 6453:645309-1-645309-9 (2007).
Farrow et al., "Peak-Power Limits on Pulsed Fiber Amplifiers Imposed by Self-Focusing," *Optics Lett.*, 31:3423-3425 (Dec. 1, 2006).
Fève et al., "Four-wave mixing in nanosecond pulsed fiber amplifiers," *Optics Express*, 15:4647-4662 (Apr. 16, 2007).
Fève et al., "Limiting Effects of Four-Wave Mixing in High-Power Pulsed Fiber Amplifiers," *Proc. of the SPIE*, 6453:64531P-1-64531P-11 (2007).
Final Office action from U.S. Appl. No. 15/607,410, dated May 11, 2018, 29 pages.
Final Office action from U.S. Appl. No. 15/607,411, dated Feb. 1, 2018, 27 pages.
Fini et al., "Bend-compensated large-mode-area fibers: achieving robust single-modedness with transformation optics," Optics Express, 21:19173-19179 (Aug. 12, 2013).
Fini, "Bend-compensated design of large-mode-area fibers," Optics Letters, 31:1963-1965 (Jul. 1, 2006).
Fini, "Large mode area fibers with asymmetric bend compensation," Optics Express, 19:21868-21873 (Oct. 24, 2011).
First Office Action for related Chinese Application No. 201610051671.X, dated Jun. 4, 2018, 25 pages (w/ English translation).
First Office Action for related Chinese Application No. 201680043132.X, dated May 21, 2019, 21 pages (with English translation).
First Office Action for related Chinese Application No. 201680055710.1, dated Oct. 8, 2019, 12 pages (with English translation).
Fox et al., "Effect of low-earth orbit space on radiation-induced absorption in rare-earth-doped optical fibers," *J. Non-Cryst. Solids*, 378:79-88 (2013).
Fox et al., "Gamma Radiation Effects in Yb-Doped Optical Fiber," *Proc. of the SPIE*, 6453:645328-1-645328-9 (2007).
Fox et al., "Gamma-Radiation-Induced Photodarkening in Unpumped Optical Fibers Doped with Rare-Earth Constituents," *IEEE Trans. on Nuclear Science*, 57:1618-1625 (Jun. 2010).
Fox et al., "Investigation of radiation-induced photodarkening in passive erbium-, ytterbium-, and Yb/Er co-doped optical fibers," *Proc. of the SPIE*, 6713:67130R-1-67130R-9 (Sep. 26, 2007).
Fox et al., "Radiation damage effects in doped fiber materials," *Proc. of the SPIE*, 6873:68731F-1-68731F-9 (2008).
Fox et al., "Spectrally Resolved Transmission Loss in Gamma Irradiated Yb-Doped Optical Fibers," *IEEE J. Quant. Electron.*, 44:581-586 (Jun. 2008).
Fox et al., "Temperature and Dose-Rate Effects in Gamma Irradiated Rare-Earth Doped Fibers," *Proc. of SPIE*, 7095:70950B-1-70950B-8 (2008).
Fuchs et al., "Beam shaping concepts with aspheric surfaces," Proc. of SPIE, 9581:95810L-1-95810L-7 (Aug. 25, 2015).
Fuse, "Beam Shaping for Advanced Laser Materials Processing," Laser Technik Journal, pp. 19-22 (Feb. 2015).
Garcia et al., "Fast adaptive laser shaping based on multiple laser incoherent combining," Proc. of SPIE, 10097:1009705-1-1009705-15 (Feb. 22, 2017).
Ghasemi et al., "Beam shaping design for coupling high power diode laser stack to fiber," *Applied Optics*, 50:2927-2930 (Jun. 20, 2011).
Ghatak et al., "Design of Waveguide Refractive Index Profile to Obtain Flat Model Field", *SPIE*, 3666:40-44 (Apr. 1999).
Goers et al., "Development of a Compact Gas Imaging Sensor Employing cw Fiber-Amp-Pumped PPLN OPO," *Conference on Lasers and Electro-Optics*, OSA Technical Digest (Optical Society of America, Washington, DC), p. 521 (2001).
Goldberg et al., "Deep UV Generation by Frequency Quadrupling of a High-Power GaAlAs Semiconductor Laser," *Optics Lett.*, 20:1145-1147 (May 15, 1995).
Goldberg et al., "Deep UV Generation by Frequency Tripling and Quadrupling of a High-Power Modelocked Semiconductor Laser," Proceedings of the Quantum Electronics and Laser Science Conference, QPD18-2 (Baltimore) 2 pages (May 1995).
Goldberg et al., "High Efficiency 3 W Side-Pumped Yb Fiber Amplifier and Laser," *Conference on Lasers and Electro-Optics*, OSA Technical Digest (Optical Society of America, Washington, DC), p. 11-12 (1999).
Goldberg et al., "Highly Efficient 4-W Yb-Doped Fiber Amplifier Pumped by a Broad-Stripe Laser Diode," *Optics Lett.*, 24:673-675 (May 15, 1999).
Goldberg et al., "High-Power Superfluorescent Source with a Side-Pumped Yb-Doped Double-Cladding Fiber," *Optics Letters*, 23:1037-1039 (Jul. 1, 1998).
Goldberg et al., "Tunable UV Generation at 286 nm by Frequency Tripling of a High-Power Modelocked Semiconductor Laser," *Optics Lett.*, 20:1640-1642 (Aug. 1, 1995).
Golub, "Laser Beam Splitting by Diffractive Optics," *Optics and Photonics News*, 6 pages (Feb. 2004).
Gris-Sanchez et al., "The Airy fiber: an optical fiber that guides light diffracted by a circular aperture," Optica, 3:270-276 (Mar. 2016).
Han et al., "Reshaping collimated laser beams with Gaussian profile to uniform profiles," *Applied Optics*, 22:3644-3647 (Nov. 15, 1983).
Headrick et al., "Application of laser photofragmentation-resonance enhanced multiphoton ionization to ion mobility spectrometry," *Applied Optics*, 49:2204-2214 (Apr. 10, 2010).
Hemenway et al., "Advances in high-brightness fiber-coupled laser modules for pumping multi-kW CW fiber lasers," Proceedings of SPIE, 10086:1008605-1-1008605-7 (2017).
Hemenway et al., "High-brightness, fiber-coupled pump modules in fiber laser applications," *Proc. of SPIE*, 8961:89611V-1-89611V-12 (2014).
Hoops et al., "Detection of mercuric chloride by photofragment emission using a frequency-converted fiber amplifier," *Applied Optics*, 46:4008-4014 (Jul. 1, 2007).
Hotoleanu et al., "High Order Mode Suppression in Large Mode Area Active Fibers by Controlling the Radial Distribution of the Rare Earth Dopant," *Proc. of the SPIE*, 6102:61021T-1-61021T-8 (2006).
Huang et al., "All-fiber mode-group-selective photonic lantern using graded-index multimode fibers," Optics Express, 23:224-234 (Jan. 6, 2015).
Huang et al., "Double-cutting beam shaping technique for high-power diode laser area light source," *Optical Engineering*, 52:106108-1-106108-6 (Oct. 2013).
Injeyan et al., "Introduction to Optical Fiber Lasers," High-Power Laser Handbook, pp. 436-439 (2011).
International Preliminary Report on Patentability from International Application No. PCT/US2018/024904, dated Nov. 26, 2019, 4 pages.
International Preliminary Report on Patentability from International Application No. PCT/US2018/024908, dated Nov. 26, 2019, 6 pages.

(56) References Cited

OTHER PUBLICATIONS

International Search Report and Written Opinion for International Application No. PCT/US2018/015895, dated Jul. 10, 2018, 10 pages.
International Search Report and Written Opinion for International Application No. PCT/US2018/024944, dated Jul. 12, 2018, 8 pages.
International Search Report and Written Opinion for International Application No. PCT/US2018/023 963, dated Aug. 9, 2018, 7 pages.
International Search Report and Written Opinion for International Application No. PCT/US2018/024899, dated Aug. 9, 2018, 7 pages.
International Search Report and Written Opinion for International Application No. PCT/US2018/024955, dated Aug. 9, 2018, 8 pages.
International Search Report and Written Opinion for International Application No. PCT/US2018/024953, dated Aug. 16, 2018, 8 pages.
International Search Report and Written Opinion for related International Application No. PCT/US2016/041526, 6 pages, dated Oct. 20, 2016.
International Search Report and Written Opinion for related International Application No. PCT/US2016/053807, 6 pages, dated Jan. 19, 2017.
International Search Report and Written Opinion from International Application No. PCT/US2017/034848, dated Nov. 28, 2017, 15 pages.
International Search Report and Written Opinion from International Application No. PCT/US2018/024145, dated Jun. 21, 2018, 5 pages.
International Search Report and Written Opinion from International Application No. PCT/US2018/024974, dated Jul. 12, 2018, 6 pages.
International Search Report and Written Opinion from International Application No. PCT/US2018/023 012, dated Aug. 9, 2018, 7 pages.
International Search Report and Written Opinion from International Application No. PCT/US2018/024958, dated Aug. 23, 2018, 6 pages.
International Search Report and Written Opinion from International Application No. PCT/US2018/024227, dated Aug. 30, 2018, 7 pages.
International Search Report and Written Opinion from International Application No. PCT/US2018/024971, dated Aug. 30, 2018, 8 pages.
International Search Report and Written Opinion from International Application No. PCT/US2018/024908, dated Jul. 19, 2018, 8 pages.
International Search Report and Written Opinion from International Application No. PCT/US2018/024641, dated Jul. 12, 2018, 6 pages.
Ishiguro et al., "High Efficiency 4-kW Fiber Laser Cutting Machine," *Rev. Laser Eng.*, 39:680-684 (2011).
Ivanov et al., "Fiber structure based on a depressed inner cladding fiber for bend, refractive index and temperature sensing," *Meas. Sci. Technol.*, 25:1-8 (2014).
Ivanov et al., "Fiber-Optic Bend Sensor Based on Double Cladding Fiber," *Journal of Sensors*, 2015, 6 pages (2015).
Jain et al., "Multi-element fiber technology for space-division multiplexing applications," Optics Express, 22:3787-3796 (Feb. 11, 2014).
Jin et al., "Mode Coupling Effects in Ring-Core Fibers for Space-Division Multiplexing Systems," Journal of Lightwave Technology, 34:3365-3372 (Jul. 15, 2016).
Johnson et al., "Experimental and Theoretical Study of Inhomogeneous Electron Transfer in Betaine: Comparisons of Measured and Predicted Spectral Dynamics," *Chem. Phys.*, 176:555-574 (Oct. 15, 1993).
Johnson et al., "Ultrafast Experiments on the Role of Vibrational Modes in Electron Transfer," *Pure and Applied Chem.*, 64:1219-1224 (1992).
Jollivet et al., "Advances in Multi-Core Fiber Lasers," Latin America Optics and Photonics Conference, OSA Technical, 4 pages (Nov. 2014).
Jollivet, "Specialty Fiber Lasers and Novel Fiber Devices," Doctoral Dissertation, Univeristy of Central Florida, 213 pages (2014).
Kliner et al. "Effect of Indistinguishable Nuclei on Product Rotational Distributions: H+HI→$H_2$+I reaction$^{a)}$," *J. Chem. Phys.*, 90:4625-4327 (Apr. 15, 1989).
Kliner et al., "4-kW fiber laser for metal cutting and welding," *Proc. of SPIE*, 7914:791418-791418-8 (2011).
Kliner et al., "Comparison of Experimental and Theoretical Absolute Rates for Intervalence Electron Transfer," *J. Am. Chem. Soc.*, 114:8323-8325 (1992).
Kliner et al., "Comparison of Experimental and Theoretical Integral Cross Sections for D+$H_2$(v=1, j=1)→HD(v'= 1, j')+H," *J. Chem. Phys.*, 95:1648-1662 (Aug. 1, 1991).
Kliner et al., "D+$H_2$(v=1, J=1): Rovibronic State to Rovibronic State Reaction Dynamics," *J. Chem. Phys.*, 92:2107-2109 (Feb. 1, 1990).
Kliner et al., "Efficient second, third, fourth, and fifth harmonic generation of a Yb-doped fiber amplifier," *Optics Communications*, 210:393-398 (Sep. 15, 2002).
Kliner et al., "Efficient UV and Visible Generation Using a Pulsed Yb-Doped Fiber Amplifier," *Conference on Lasers and Electro-Optics*, OSA Technical Digest (Optical Society of America, Washington, DC), p. CPDC10-1-CPDC10-3 (2002).
Kliner et al., "Efficient visible and UV generation by frequency conversion of a mode-filtered fiber amplifier," *Proc. of SPIE*, 4974:230-235 (2003).
Kliner et al., "Fiber laser allows processing of highly reflective materials," *Industrial Laser Solutions*, 31:1-9 (Mar. 16, 2016).
Kliner et al., "High-Power Fiber Lasers," *Photonics & Imaging Technology*, pp. 2-5 (Mar. 2017).
Kliner et al., "Laboratory Investigation of the Catalytic Reduction Technique for Detection of Atmospheric $NO_y$," *J. Geophys. Res.*, 102:10759-10776 (May 20, 1997).
Kliner et al., "Laser Reflections: How fiber laser users are successfully processing highly reflective metals," Shop Floor Lasers, available at: http://www.shopfloorlasers.com/laser-cutting/fiber/354-laser-reflections, 9 pages (Jan./Feb. 2017).
Kliner et al., "Measurements of Ground-State OH Rotational Energy-Transfer Rates," *J. Chem. Phys.*, 110:412-422 (Jan. 1, 1999).
Kliner et al., "Mode-Filtered Fiber Amplifier," Sandia National Laboratories—Brochure, 44 pages (2007).
Kliner et al., "Narrow-Band, Tunable, Semiconductor-Laser-Based Source for Deep-UV Absorption Spectroscopy," *Optics Letters*, 22:1418-1420 (Sep. 15, 1997).
Kliner et al., "Overview of Sandia's fiber laser program," Proceedings of SPIE—The International Society for Optical Engineering, 6952:695202-1-695202-12 (2008).
Kliner et al., "Photodissociation and Vibrational Relaxation of $I_2^-$ in Ethanol," *J. Chem. Phys.*, 98:5375-5389 (Apr. 1, 1993).
Kliner et al., "Photodissociation Dynamics of 12 in Solution," *Ultrafast Reaction Dynamics and Solvent Effects*, (American Institute of Physics, New York), pp. 16-35 (1994).
Kliner et al., "Polarization-Maintaining Amplifier Employing Double-Clad, Bow-Tie Fiber," *Optics Lett.*, 26:184-186 (Feb. 15, 2001).
Kliner et al., "Power Scaling of Diffraction-Limited Fiber Sources," *Proc. of SPIE*, 5647:550-556 (2005).
Kliner et al., "Power Scaling of Rare-Earth-Doped Fiber Sources," *Proc. of SPIE*, 5653:257-261 (2005).
Kliner et al., "Product Internal-State Distribution for the Reaction H+HI→$H_2$+I," *J. Chem. Phys.*, 95:1663-1670 (Aug. 1, 1991).
Kliner et al., "The D+$H_2$ Reaction: Comparison of Experiment with Quantum-Mechanical and Quasiclassical Calculations," *Chem. Phys. Lett.*, 166:107-111 (Feb. 16, 1990).
Kliner et al., "The H+para-$H_2$ reaction: Influence of dynamical resonances on H2(v'=1, j'=1 and 3) Integral Cross Sections," *J. Chem. Phys.*, 94:1069-1080 (Jan. 15, 1991).
Kliner, "Novel, High-Brightness, Fibre Laser Platform for kW Materials Processing Applications," 2015 European Conference on Lasers and Electro-Optics—European Quantum Electronics Conference (Optical Society of America, 2015), paper CJ_11_2, 1 page (2015).
Koplow et al., A New Method for Side Pumping of Double-Clad Fiber Sources, *J. Quantum Electron.*, 39:529-540 (2003).

(56) References Cited

OTHER PUBLICATIONS

Koplow et al., "Compact 1-W Yb-Doped Double-Cladding Fiber Amplifier Using V-Groove Side-Pumping," *IEEE Photonics Technol. Lett.*, 10:793-795 (Jun. 1998).
Koplow et al., "Development of a Narrowband, Tunable, Frequency-Quadrupled Diode Laser for UV Absorption Spectroscopy," *Appl. Optics*, 37:3954-3960 (Jun. 20, 1998).
Koplow et al., "Diode-Bar Side-Pumping of Double-Clad Fibers," Proceedings of the Solid State and Diode Laser Technology Review (Directed Energy Professional Society) (2005).
Koplow et al., "Diode-Bar Side-Pumping of Double-Clad Fibers," *Proc. of SPIE*, 5709:284-300 (Apr. 22, 2005).
Koplow et al., "High Power PM Fiber Amplifier and Broadband Source," *Optical Fiber Communication Conference*, OSA Technical Digest (Optical Society of America, Washington, DC), p. 12-13 (2000).
Koplow et al., "Polarization-Maintaining, Double-Clad Fiber Amplifier Employing Externally Applied Stress-Induced Birefringence," *Optics Lett.*, 25:387-389 (Mar. 15, 2000).
Koplow et al., "Single-mode operation of a coiled multimode fiber amplifier," Optics Letters, 25:442-444 (Apr. 1, 2000).
Koplow et al., Use of Bend Loss to Obtain Single-Transverse-Mode Operation of a Multimode Fiber Amplifier, *Conference on Lasers and Electro-Optics*, OSA Technical Digest (Optical Society of America, Washington, DC), p. 286-287 (2000).
Koplow et al., "UV Generation by Frequency Quadrupling of a Yb-Doped Fiber Amplifier," *IEEE Photonics Technol. Lett.*, 10:75-77 (Jan. 1998).
Koponen et al., "Photodarkening Measurements in Large-Mode-Area Fibers," *Proc. of SPIE*, 6453:64531E-1-64531E-12 (2007).
Kotlyar et al., "Asymmetric Bessel-Gauss beams," J. Opt. Soc. Am. A, 31:1977-1983 (Sep. 2014).
Kulp et al., "The application of quasi-phase-matched parametric light sources to practical infrared chemical sensing systems," *Appl. Phys. B*, 75:317-327 (2002).
Longhi et al., "Self-focusing and nonlinear periodic beams in parabolic index optical fibres," J. Opt. B: Quantum Semiclass. Opt., 6:S303-S308 (May 2004).
Maechling et al., "Sum Frequency Spectra in the C—H Stretch Region of Adsorbates on Iron," *Appl. Spectrosc.*, 47:167-172 (1993).
Martins et al., "Modeling of Bend Losses in Single-Mode Optical Fibers," *7th Conference on Telecommunications*, 4 pages (Jan. 2009).
McComb et al., "Pulsed Yb:fiber system capable of >250 kW peak power with tunable pulses in the 50 ps to 1.5 ns range," *Proc. of SPIE*, 8601:86012T-1-86012T-11 (2013).
Messerly et al., "Field-flattened, ring-like propagation modes," Optics Express, 21:12683-12698 (May 16, 2013).
Messerly et al., "Patterned flattened modes," Optics Letters, 38:3329-3332 (Sep. 1, 2013).
Moore et al., "Diode-bar side pumping of double-clad fibers," *Proc. of SPIE*, 6453:64530K-1-64530K-9 (2007).
Neilson et al., "Free-space optical relay for the interconnection of multimode fibers," Applied Optics, 38:2291-2296 (Apr. 10, 1999).
Neilson et al., "Plastic modules for free-space optical interconnects," Applied Optics, 37:2944-2952 (May 10, 1998).
Neuhauser et al., "State-to-State Rates for the D+H$_2$(v=1, j=1)→HD(v', j')+H Reaction: Predictions and Measurements," *Science*, 257:519-522 (Jul. 24, 1992).
Notice of Allowance and Examiner-Initiated Interview Summary from U.S. Appl. No. 15/607,411, dated Jan. 7, 2019, 14 pages.
Notice of Allowance for related U.S. Appl. No. 14/293,941, 5 pages, dated May 6, 2016.
Notice of Allowance from U.S. Appl. No. 15/607,399, dated Jun. 4, 2019, 15 pages.
Notice of Allowance from U.S. Appl. No. 15/607,410, dated Jul. 10, 2019, 37 pages.
Notice of Allowance from U.S. Appl. No. 15/939,064, dated Aug. 13, 2019, 13 pages.
Office action and Applicant-Initiated Interview Summary from U.S. Appl. No. 15/607,410, dated Dec. 31, 2018, 63 pages.
Office Action for related U.S. Appl. No. 14/293,941, 6 pages, dated May 11, 2015.
Office Action for related U.S. Appl. No. 14/293,941, 9 pages, dated Dec. 1, 2015.
Office Action for related U.S. Appl. No. 15/074,838, 12 pages, dated May 19, 2017.
Office action from U.S. Appl. No. 15/607,399, dated Jan. 11, 2019, 63 pages.
Office action from U.S. Appl. No. 15/607,399, dated Sep. 20, 2017, 25 pages.
Office action from U.S. Appl. No. 15/607,399, dated Sep. 14, 2018, 19 pages.
Office action from U.S. Appl. No. 15/607,410, dated Oct. 3, 2017, 32 pages.
Office action from U.S. Appl. No. 15/607,411, dated Jun. 12, 2018, 19 pages.
Office action from U.S. Appl. No. 15/607,411, dated Sep. 26, 2017, 15 pages.
Office action from U.S. Appl. No. 15/939,064, dated Apr. 18, 2019, 52 pages.
Office action from U.S. Appl. No. 15/939,064, dated Jul. 27, 2018, 7 pages.
Office action from U.S. Appl. No. 15/939,064, dated Oct. 5, 2018, 22 pages.
Office action from U.S. Appl. No. 16/402,147, dated Jun. 14, 2019, 10 pages.
Official Letter and Search Report from Taiwan Application No. 106133704, dated Mar. 13, 2019, 29 pages (with English translation).
Olsen, "Laser metal cutting with tailored beam patterns," available at: https://www.industrial-lasers.com/articles/print/volume-26/issue-5/features/laser-metal-cutting-with-tailored-beam-patterns.html, 8 pages (Sep. 1, 2011).
Price et al., "High-brightness fiber-coupled pump laser development," *Proc. of SPIE*, 7583:758308-1-758308-7 (2010).
Rinnen et al. "Quantitative Determination of HD Internal State Distributions via (2+1) REMPI," *Isr. J. Chem.*, 29:369-382 (1989).
Rinnen et al., "Construction of a Shuttered Time-of-Flight Mass Spectrometer for Selective Ion Detection," *Rev. Sci. Instrum.*, 60:717-719 (Apr. 1989).
Rinnen et al., "Effect of Indistinguishable Nuclei on Product Rotational Distributions: D+DI→D$_2$+I," *Chem. Phys. Lett.*, 169:365-371 (Jun. 15, 1990).
Rinnen et al., "Quantitative determination of H$_2$, HD, and D$_2$ internal state distributions via (2+1) resonance-enhanced multiphoton ionization," *J. Chem. Phys.*, 95:214-225 (Jul. 1, 1991).
Rinnen et al., "The H+D$_2$ Reaction: Quantum State Distributions at Collision Energies of 1.3 and 0.55 eV," *J. Chem. Phys.*, 91:7514-7529 (Dec. 15, 1989).
Rinnen et al., "The H+D$_2$ Reaction: "Prompt" HD Distributions at High Collision Energies," *Chem. Phys. Lett.*, 153:371-375 (Dec. 23, 1988).
Romero et al., "Lossless laser beam shaping," *J. Opt. Soc. Am. A*, 13:751-760 (Apr. 1996).
Sanchez-Rubio et al., "Wavelength Beam Combining for Power and Brightness Scaling of Laser Systems," *Lincoln Laboratory Journal*, 20:52-66 (2014).
Saracco et al., Compact, 17 W average power, 100 kW peak power, nanosecond fiber laser system, *Proc. of SPIE*, 8601:86012U-1-86012U-13 (2013).
Schrader et al., "Fiber-Based Laser with Tunable Repetition Rate, Fixed Pulse Duration, and Multiple Wavelength Output," *Proc. of the SPIE*, 6453:64530D-1-64530D-9 (2007).
Schrader et al., "High-Power Fiber Amplifier with Widely Tunable Repetition Rate, Fixed Pulse Duration, and Multiple Output Wavelengths," *Optics Express*, 14:11528-11538 (Nov. 27, 2006).
Schrader et al., "Power scaling of fiber-based amplifiers seeded with microchip lasers," *Proc. of the SPIE*, 6871:68710T-1-68710T-11 (2008).

(56) References Cited

OTHER PUBLICATIONS

Schulze et al., "Mode Coupling in Few-Mode Fibers Induced by Mechanical Stress," Journal of Lightwave Technology, 33:4488-4496 (Nov. 1, 2015).

Sheehan et al. "High-brightness fiber laser advances remote laser processing," *Industrial Laser Solutions*, 31:1-9 (Nov. 2, 2016).

Sheehan et al., "Faserlaser zur Bearbeitung hochreflektierender Materialien (Fiber laser processing of highly reflective materials)," *Laser*, 3:92-94 (Jun. 2017).

Skutnik et al., "Optical Fibers for Improved Low Loss Coupling of Optical Components," Proc. of SPIE, Photon Processing in Microelectronics and Photnics III, 6 pages (Jul. 15, 2004).

Sun et al., "Optical Surface Transformation: Changing the optical surface by homogeneous optic-null medium at will," *Scientific Reports*, 5:16032-1-16032-20 (Oct. 30, 2015).

Tominaga et al., "Femtosecond Experiments and Absolute Rate Calculations on Intervalence Electron Transfer in Mixed-Valence Compounds," *J. Chem. Phys.*, 98:1228-1243 (Jan. 15, 1993).

Tominaga et al., "Ultrafast Studies of Intervalence Charge Transfer," *Ultrafast Phenomena VIII*, (Springer-Verlag, New York), pp. 582-584 (1993).

Varshney et al., "Design of a flat field fiber with very small dispersion slope", *Optical Fiber Technology*, 9(3):189-198 (Oct. 2003).

Wetter et al., "High power cladding light strippers," Proc. of SPIE, 6873:687327-1-687327-8 (Jan. 21, 2008).

Xiao et al., "Fiber coupler for mode selection and high-efficiency pump coupling," Optics Letters, 38:1170-1172 (Apr. 1, 2013).

Yaney et al., "Distributed-Feedback Dye Laser for Picosecond UV and Visible Spectroscopy," *Rev. Sci. Instrum*, 71:1296-1305 (Mar. 2000).

Yu et al., "1.2-kW single-mode fiber laser based on 100-W high-brightness pump diodes," *Proc. of SPIE*, 8237:82370G-1-82370G-7 (2012).

Zhang et al., "Switchable multi wavelength fiber laser by using a compact in-fiber Mach-Zehnder interferometer," J. Opt., 14:1-5 (2012).

Zheng et al., "Bending losses of trench-assisted few-mode optical fibers," Applied Optics, 55:2639-2648 (Apr. 1, 2016).

Zlodeev et al., "Transmission spectra of a double-clad fibre structure under bending," Quantum Electronics, 48:535-541 (2013).

\* cited by examiner

| Tilt (°) | Coupling eff. | ⌀14um, 0.07 NA LP01 into ⌀50um, 0.23 NA feeding fiber | | | | | | |
|---|---|---|---|---|---|---|---|---|
| | | Wx (um) | Wy (um) | Mx2 | My2 | BPPx (mm-mrad) | BPPy (mm-mrad) | BPPr (mm-mrad) |
| 0.00 | 1.000 | 19.00 | 19.00 | 2.73 | 2.73 | 0.939 | 0.939 | 0.939 |
| 0.25 | 1.000 | 18.96 | 19.14 | 2.75 | 2.82 | 0.945 | 0.970 | 0.957 |
| 0.50 | 1.000 | 18.86 | 19.57 | 2.80 | 3.07 | 0.963 | 1.056 | 1.009 |
| 0.75 | 1.000 | 18.73 | 20.17 | 2.89 | 3.46 | 0.993 | 1.190 | 1.092 |
| 1.00 | 1.000 | 18.59 | 20.86 | 3.02 | 3.96 | 1.038 | 1.361 | 1.200 |
| 1.30 | 1.000 | 18.44 | 21.65 | 3.24 | 4.65 | 1.114 | 1.598 | 1.356 |
| 1.60 | 1.000 | 18.35 | 22.32 | 3.53 | 5.39 | 1.213 | 1.852 | 1.533 |

| Tilt (°) | Coupling eff. | ⌀40um, 0.08 NA LP01+LP02+LP03 into ⌀100um, 0.23 NA feeding fiber | | | | | | | |
|---|---|---|---|---|---|---|---|---|---|
| | | Wx (um) | Wy (um) | Mx2 | My2 | BPPx (mm-mrad) | BPPy (mm-mrad) | BPPr (mm-mrad) |
| 0.00 | 1.000 | 39.32 | 39.32 | 5.80 | 5.80 | 1.995 | 1.995 | 1.995 |
| 0.25 | 1.000 | 38.62 | 40.52 | 5.65 | 6.23 | 1.942 | 2.142 | 2.042 |
| 0.50 | 1.000 | 37.22 | 43.00 | 5.38 | 7.22 | 1.848 | 2.481 | 2.164 |
| 0.75 | 1.000 | 36.41 | 44.86 | 5.40 | 8.24 | 1.850 | 2.830 | 2.340 |
| 1.00 | 1.000 | 36.80 | 45.39 | 5.88 | 9.01 | 2.021 | 3.097 | 2.559 |
| 1.25 | 1.000 | 37.77 | 45.07 | 6.68 | 9.64 | 2.297 | 3.315 | 2.806 |

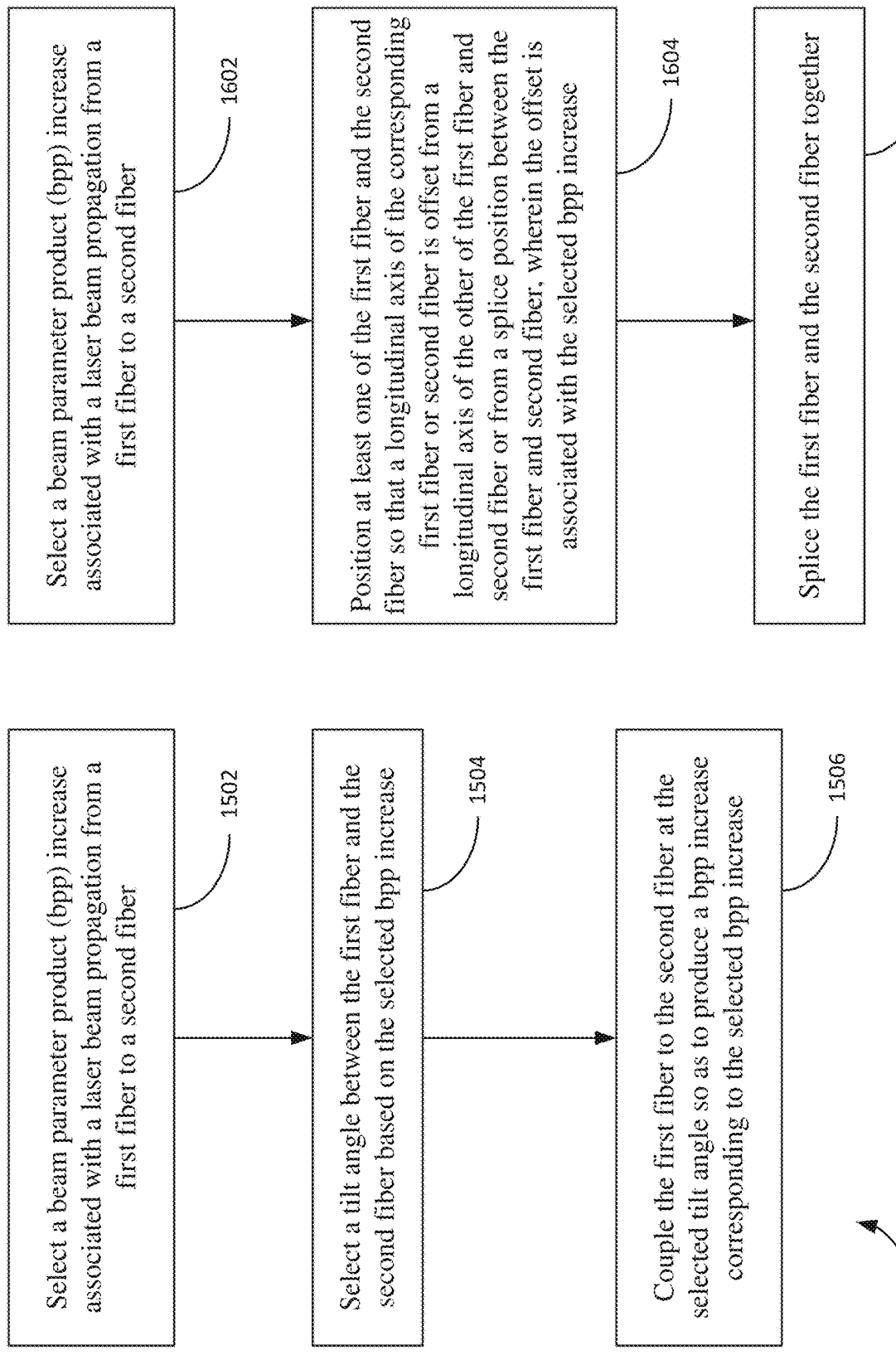

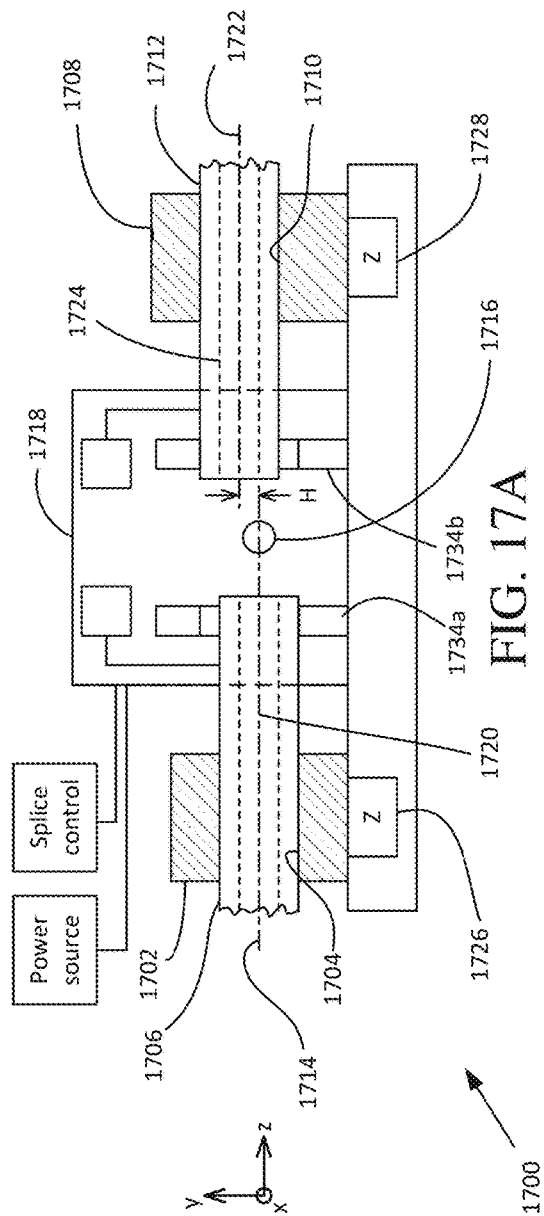
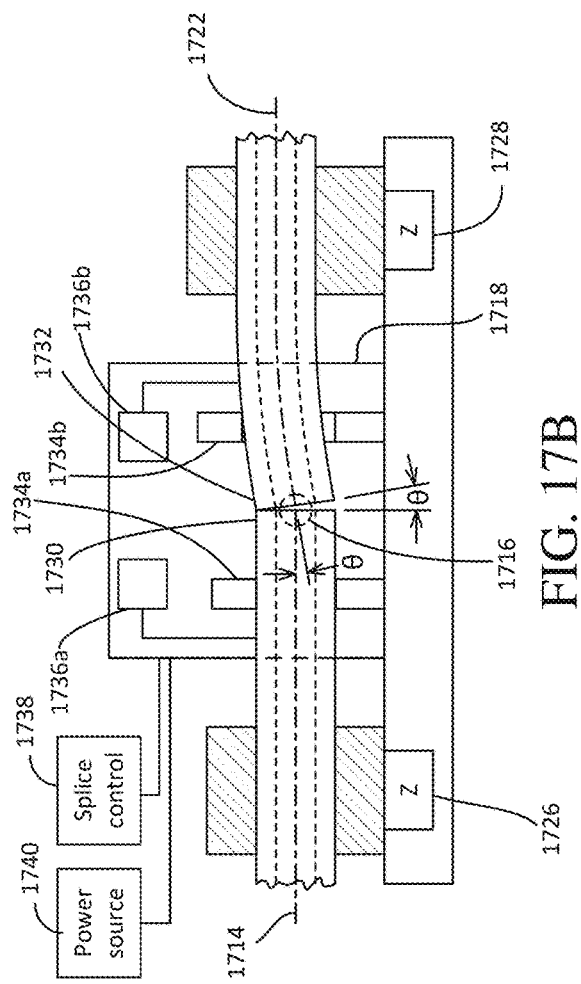
FIG. 17A
FIG. 17B

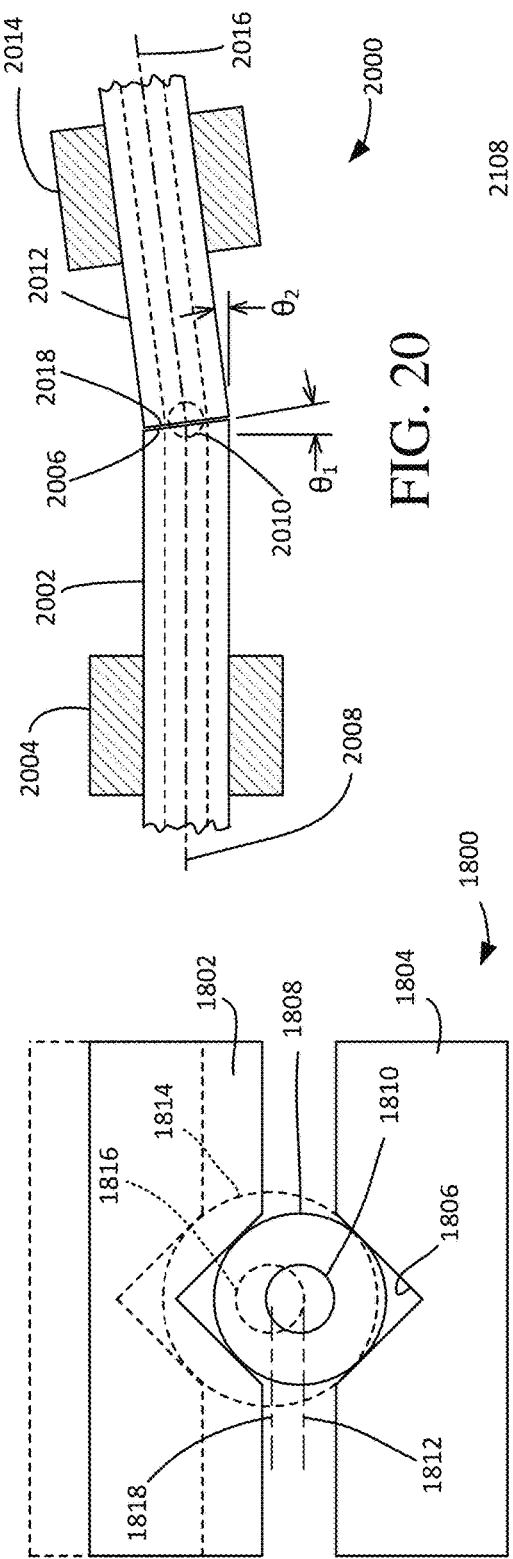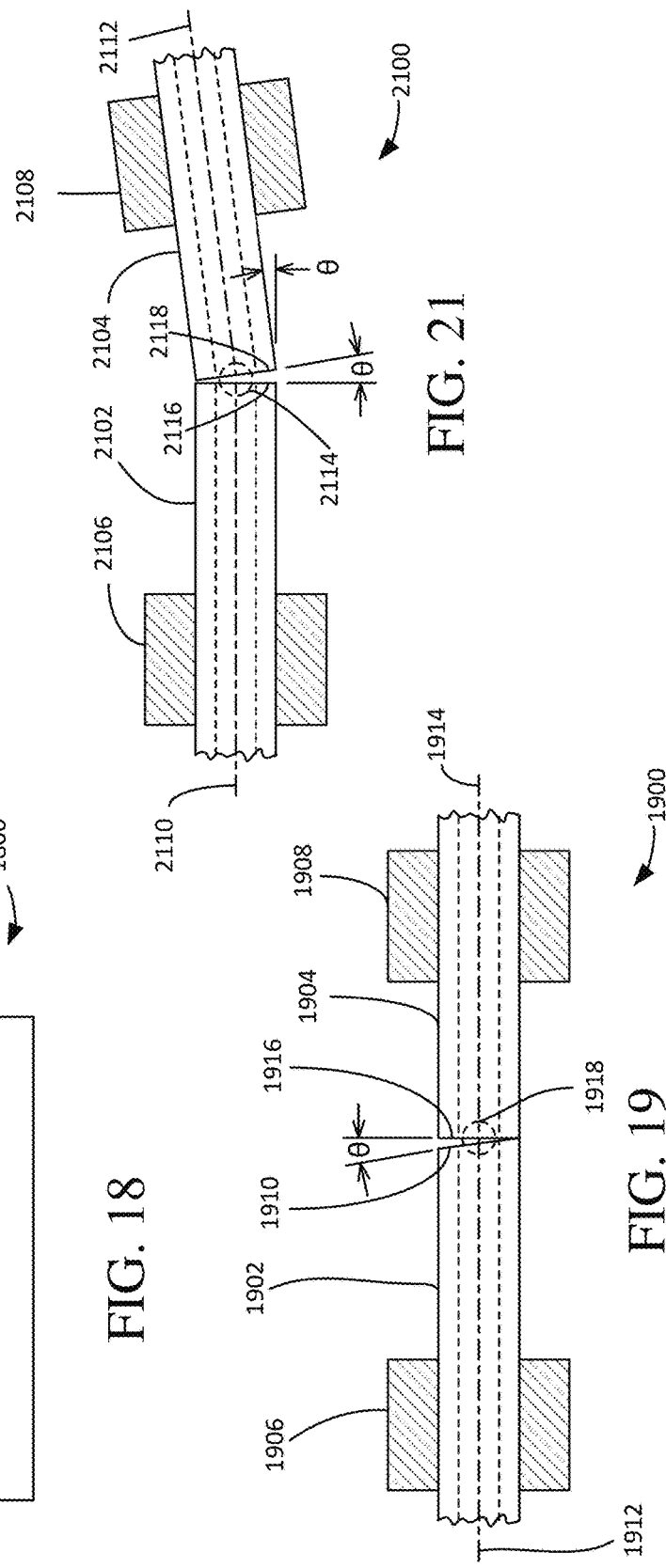

BEAM PARAMETER PRODUCT (BPP) CONTROL BY VARYING FIBER-TO-FIBER ANGLE

CROSS REFERENCE TO RELATED APPLICATIONS

This application is a divisional application of U.S. patent application Ser. No. 15/276,589 that was filed Sep. 26, 2016, which claims the benefit of U.S. Provisional Patent Application No. 62/232,379 that was filed Sep. 24, 2015 and is related to U.S. Provisional Patent Application No. 62/190,047 that was filed Jul. 8, 2015. These applications are incorporated herein by reference in their entireties.

FIELD

The disclosure pertains to optical fiber laser systems and beam delivery systems.

BACKGROUND

In meeting customer requirements and market demand, fiber laser systems are often characterized by a set of output characteristics variable from system to system, including output power and beam quality. For example, in some laser applications, perfect, diffraction-limited (or close to perfect) beam quality is necessary while in others a reduced beam quality is sufficient (or may even be preferred) to meet process requirements. In addition, various steps of the laser process supply chain can benefit from having predictable beam quality. Also, in designing fiber laser systems, it can be desirable to have sets of components that can be common across platforms and architectures. While methods for maximizing laser beam quality have received much attention, low cost methods of manufacturing laser systems with selectable beam quality are lacking. Therefore, a need remains for solutions to overcome these drawbacks.

SUMMARY

According to an aspect of the disclosed technology, an apparatus includes a laser system that includes a first fiber having an output end and situated to propagate a first laser beam with a first beam parameter product (bpp) and a second fiber having an input end spliced to the output end of the first fiber at a fiber splice so as to receive the first laser beam and to form a second laser beam having a second bpp that is greater than the first bpp, wherein the output end of the first fiber and the input end of the second fiber are spliced at a tilt angle so as to increase the first bpp to the second bpp.

According to another aspect of the disclosed technology, a method includes selecting a beam parameter product (bpp) increase associated with laser beam propagation from a first fiber to a second fiber, selecting a tilt angle between the first fiber and the second fiber based on the selected bpp increase, and coupling the first fiber to the second fiber at the selected tilt angle.

According to another aspect of the disclosed technology, an apparatus includes a fiber fixture situated to receive and secure an output end of a first fiber in a first position and a second fiber in a second position, a fiber tip alignment mechanism situated to align the input end of the first fiber proximate the output end of the second fiber, and a splicing mechanism situated to splice the aligned input end and output end so as to form a fiber splice having a tilt angle corresponding to a selected beam parameter product (bpp) increase associated with beam propagation through the fiber splice from the first fiber to the second fiber.

According to a further aspect of the disclosed technology, a method includes selecting a beam parameter product (bpp) increase associated with a laser beam propagation from a first fiber to a second fiber, positioning at least one of the first fiber and the second fiber so that a longitudinal axis of the corresponding first fiber or second fiber is offset from a longitudinal axis of the other of the first fiber and second fiber or from a splice position between the first fiber and second fiber, wherein the offset is associated with the selected bpp increase, and splicing the first fiber and the second fiber together.

The foregoing and other objects, features, and advantages of the disclosed technology will become more apparent from the following detailed description, which proceeds with reference to the accompanying figures.

BRIEF DESCRIPTION OF THE DRAWINGS

FIGS. 15 and 16 are flowcharts of example splicing methods.

FIGS. 17A-17B are side view schematics of an example splicing apparatus.

FIG. 18 shows an end view cross-section of an example fiber fixture.

FIGS. 19-21 shows examples of a sets of fibers arranged in position to be spliced.

DETAILED DESCRIPTION

Figure 1:
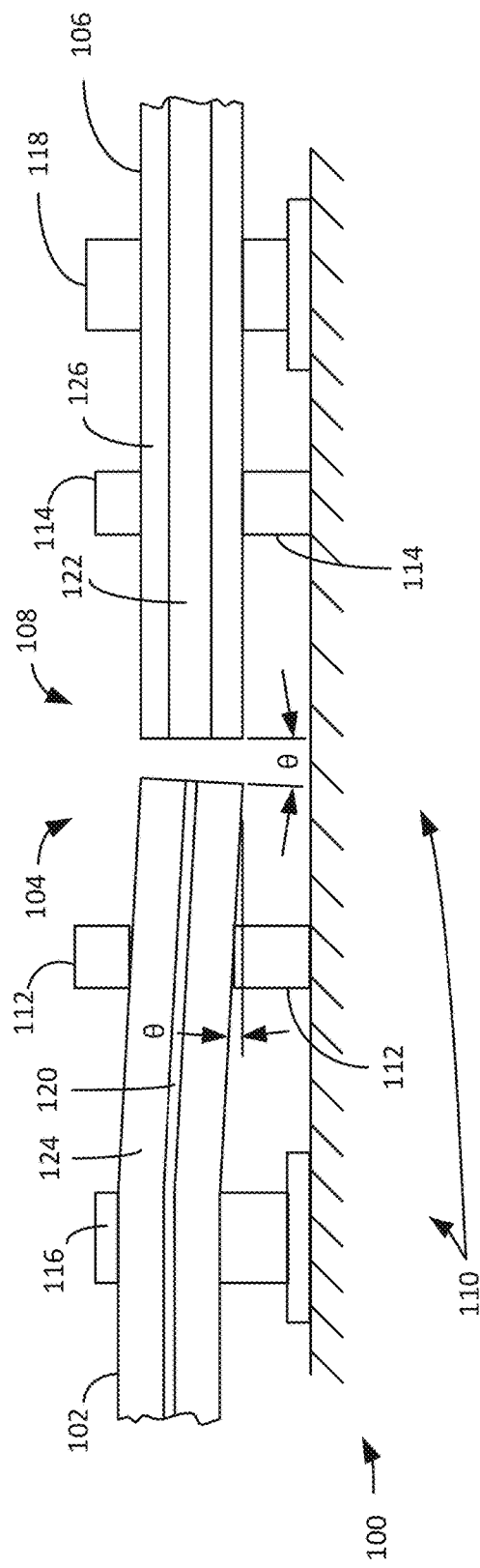
FIG. 1 is a side view schematic of a fiber splicing apparatus embodiment.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections. Examples are described with reference to directions indicated as "above," "below," "upper," "lower," and the like. These terms are used for convenient description, but do not imply any particular spatial orientation.

As used herein, optical radiation refers to electromagnetic radiation at wavelengths of between about 100 nm and 10 µm, and typically between about 500 nm and 2 µm. Examples based on available laser diode sources and optical fibers generally are associated with wavelengths of between about 800 nm and 1700 nm. In some examples, propagating optical radiation is referred to as one or more beams having diameters, asymmetric fast and slow axes, beam cross-sectional areas, and beam divergences that can depend on beam wavelength and the optical systems used for beam shaping. For convenience, optical radiation is referred to as light in some examples, and need not be at visible wavelengths.

Representative embodiments are described with reference to optical fibers, but other types of optical waveguides can be used having square, rectangular, polygonal, oval, elliptical or other cross-sections. Optical fibers are typically formed of silica (glass) that is doped (or undoped) so as to provide predetermined refractive indices or refractive index differences. In some, examples, fibers or other waveguides are made of other materials such as fluorozirconates, fluoroaluminates, fluoride or phosphate glasses, chalcogenide glasses, or crystalline materials such as sapphire, depending on wavelengths of interest. Refractive indices of silica and fluoride glasses are typically about 1.5, but refractive indices of other materials such as chalcogenides can be 3 or more. In still other examples, optical fibers can be formed in part of plastics. In typical examples, a doped waveguide core such as a fiber core provides optical gain in response to pumping, and core and claddings are approximately concentric. In other examples, one or more of the core and claddings are decentered, and in some examples, core and cladding orientation and/or displacement vary along a waveguide length.

As used herein, numerical aperture (NA) refers to a largest angle of incidence with respect to a propagation axis defined by an optical waveguide for which propagating optical radiation is substantially confined. In optical fibers, fiber cores and fiber claddings can have associated NAs, typically defined by refractive index differences between a core and cladding layer, or adjacent cladding layers, respectively. While optical radiation propagating at such NAs is generally well confined, associated electromagnetic fields such as evanescent fields typically extend into an adjacent cladding layer. In some examples, a core NA is associated with a core/inner cladding refractive index, and a cladding NA is associated with an inner cladding/outer cladding refractive index difference. For an optical fiber having a core refractive index $n_{core}$ and a cladding index $n_{clad}$, a fiber core NA is $NA=\sqrt{n_{core}^2-n_{clad}^2}$. For an optical fiber with an inner core and an outer core adjacent the inner core, a cladding NA is $NA=\sqrt{n_{inner}^2-n_{outer}^2}$, wherein $n_{inner}$ and $n_{outer}$ are refractive indices of the inner cladding and the outer cladding, respectively. Optical beams as discussed above can also be referred to as having a beam NA which is associated with a beam angular radius. While multi-core step index fibers are described below, gradient index designs can also be used. Some examples include fibers that support a few modes, and can be referred to as "few mode" fibers. Such fibers have a normalized frequency parameter (V-number) defined as $V=2\cdot\pi\cdot a\cdot NA/\lambda$ wherein $\lambda$ is vacuum wavelength, 'a' is a fiber core radius, and NA is numerical aperture. For large V-number, a total number 't' of modes 'M' supported by a fiber is approximately $M=4\cdot V^2/\pi^2+2$. For single-mode fibers, V is less than about 2.405. As used herein, a few mode fiber is defined as a fiber for which a V-number is less than about 5, 10, or 20.

In some examples disclosed herein, a waveguide core such as an optical fiber core can be doped with a rare earth element such as Nd, Yb, Ho, Er, or other active dopants or combinations thereof. Such actively doped cores can provide optical gain in response to optical or other pumping. As disclosed below, waveguides having such active dopants can be used to form optical amplifiers, or, if provided with suitable optical feedback such as reflective layers, mirrors, Bragg gratings, or other feedback mechanisms, such waveguides can generate laser emissions. Optical pump radiation can be arranged to co-propagate and/or counter-propagate in the waveguide with respect to a propagation direction of an emitted laser beam or an amplified beam. In further examples, a waveguide core can be doped with one or more passive dopants, such as Ge, P, Al, Fl, and B so as to increase, decrease, or maintain a refractive index.

A laser beam parameter product (bpp) is generally equal to the product of the radius of the laser beam waist and the half angle of the laser beam's divergence. The ratio of a bpp of a laser beam to the bpp of a corresponding ideal Gaussian beam provides an $M^2$ beam quality value for comparing different beams. Exemplary laser beams typically contain multiple transverse optical modes. Such multimode (or few mode) beams typically have $M^2$ values greater than about 2, whereas single-mode beams typically have $M^2$ values less than about 2. In some examples, the single-mode beams and multimode beams have $M^2$ value of less than or greater than about 1.8, 1.6, 1.5, 1.4, or lower, respectively. In typical examples, a multimode beam has at least a significant portion of the power content of the multimode beam in one or more transverse optical modes higher than a fundamental $LP_{01}$ mode. Beam radii are often measured from a center to position where the beam has a $1/e^2$ value of the peak intensity of the beam, though other normalizing or averaging options may be used. Divergence angles are typically determined in the far field, such as several Rayleigh lengths from a beam focus.

Fusion splicers typically include opposite fiber fixtures situated to secure opposing ends of fibers to be spliced. The opposing ends of the fibers are arranged in a center region that includes a fusion splicing mechanism, such as pair of electrodes between which the opposing fiber ends are situated for fusing and across which an arc is generated to produce the heat for the fusion splicing. Other fusion splicers can include laser sources to generate heat for fusion splicing the opposing fiber ends, or a chemical source, such as a gas flame. After the fiber fixtures secure the opposing fiber ends in the center region, a fusion cover of the fusion splicing mechanism is lowered over the secured fiber ends. A z-axis movement stage can bring one or both of the fibers in proximity to each other for fusion splicing and an x-y-z movement stage can bring one or both of the fiber tips situated in proximity so that cores, claddings, or other reference surfaces of the opposing fiber tips are aligned before heat is applied by the fusion splicer.

In FIG. 1, an apparatus 100 includes a first fiber 102 with a first fiber end 104 and a second fiber 106 with a second fiber end 108 each situated in a fusion splicer fixture 110 so that the first and second fiber ends 104, 108 are in proximity to each other. In particular, the first and second fiber ends 104, 108 are situated at a tilt angle θ instead of being parallel to each other. By situating the first and second fiber ends 104, 108 at the tilt angle θ and fusion splicing together the first and second fiber ends 104, 108, the beam parameter product of a beam propagating from the first fiber 102 to the second fiber 104 through the splice increases by an amount associated with the angle θ. In typical examples, the amount of bpp increase increases as the tilt angle increases. In representative embodiments, the bpp increase occurs as the beam passes through the splice.

The fusion splicing fixture 110 includes fiber supports 112, 114 and clamping mechanisms 116, 118 for the first and second fibers 102, 106, respectively. The clamping mechanisms 116, 118 typically come in various sizes associated with the diameter or other characteristic of the fiber to be inserted into the fusion splicer fixture 110. As shown, the first and second fibers 102, 106 have equal outer diameters of 500 μm. The second clamping mechanism 118 is sized for 500 μm fibers so that the second fiber 106 extends generally horizontally over fiber support 114. The first clamping mechanism 116 is sized for 350 μm fibers so that the first fiber 102 extends horizontally and at a tile angle due to the position of the fiber support 112 and the mismatch between the first clamping mechanism 116 and the diameter of the first fiber 102. As shown in FIG. 1, the first and second fibers 102, 106 each include respective cores 120, 122 and claddings 124, 126 with the diameter of the core 120 of the first fiber 102 being considerably smaller than the core 122 of the second fiber 106. Thus, in the example shown, the first fiber 102 is a fiber laser fiber situated to propagate a fiber laser beam ranging from about 100 W to multiple kW and the second fiber 106 is a multimode delivery fiber situated to receive the beam and deliver the beam to a target for various applications, such as cutting, welding, etc.

Figure 3:
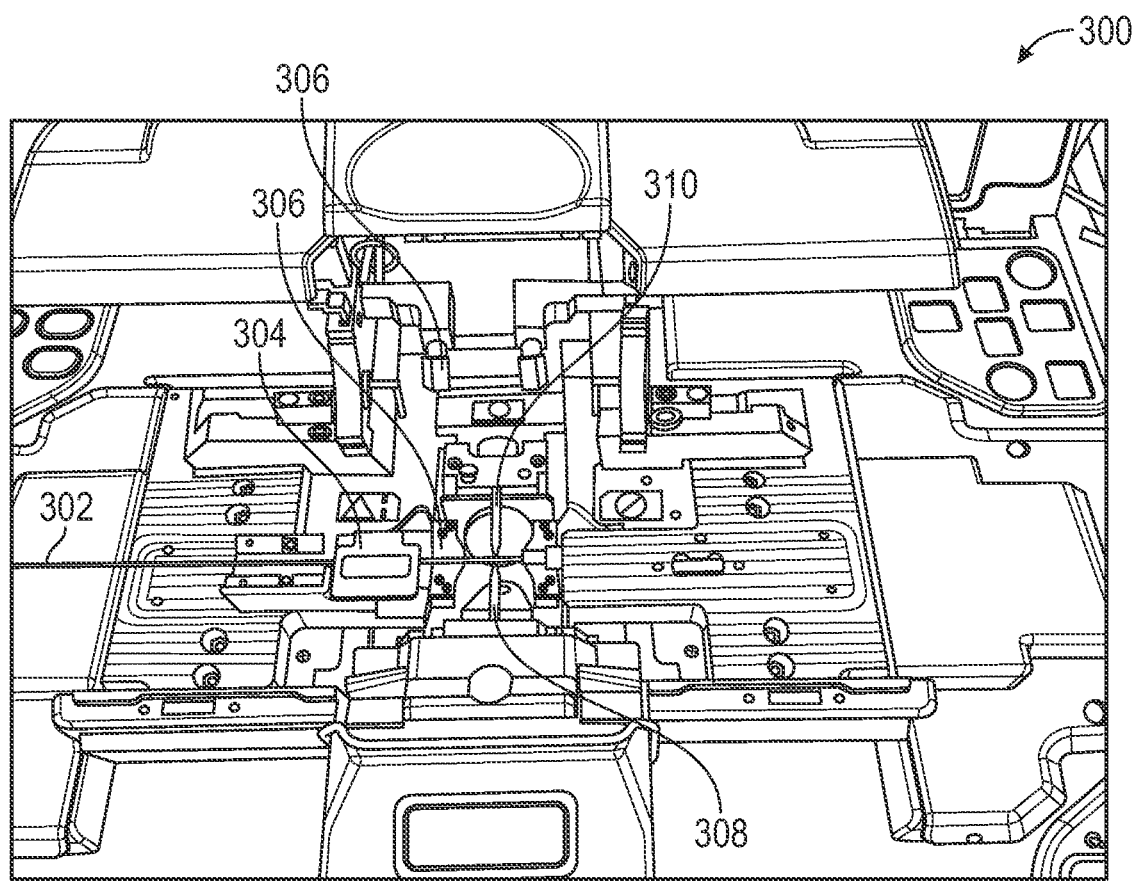
FIG. 3 is a perspective view of an example fusion splicing apparatus.

FIG. 3 shows an image of a fusion splicer fixture 300 with a first fiber 302 having a 510 μm outer diameter being secured in an outer fusion splicer fixture 304 having a V-groove associated with a 350 μm fiber. The first fiber 302 extends through an inner fusion splicer fixture 306 having a V-groove for receiving the fiber. The inner fusion splicer fixture 306 is generally laterally translatable so as to position the end of the first fiber 302 in alignment a second fiber end and with a pair of electrodes 308, 310 that extend perpendicular to a longitudinal direction of the first fiber 302 and are situated to provide energy for fusion splicing of the first fiber to a second fiber (not shown). Suitable fusion splicers are commercially available from Fitel and Fujikura. However, arranging fibers, such as the first fiber 302 and the second fiber, at selectable tilt angles is generally not supported as conventional splicers seek to avoid any tilt between adjacent fiber ends to be spliced. Various other methods may be used, in view of the present disclosure, to provide the tilt angle, including translation stages adjusting relative heights and angles of fiber sections to be spliced, as well as fusion splicers suitably programmed and having suitable fiber end to fiber end adjustment mechanisms. Furthermore, one or both fiber ends of the first fiber 302 and second fiber to be spliced can also be cleaved at a selected non-zero angle perpendicular to the longitudinal fiber axes of the corresponding fiber ends.

Figure 2:
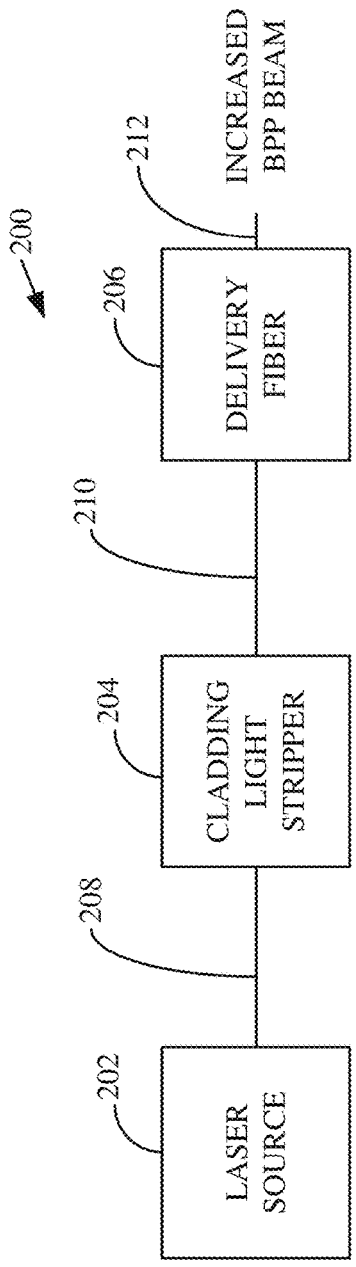
FIG. 2 is a schematic of an example laser system.

FIG. 2 shows an apparatus 200 including a laser source 202, a cladding light stripper 204, and a delivery fiber 206. The laser source 202 can include one or more gain fibers, such as a fiber oscillator or a fiber oscillator with one or more fiber amplifiers, as well as other types of laser sources that can provide an optical beam. The laser source 202 is coupled to the cladding light stripper 204 directly or with a passive fiber section 208. The cladding light stripper 204 is coupled directly or with a passive fiber section 210 to the delivery fiber 206. At one or more locations between the laser source 202 and a fiber laser beam output 212, a fiber splice optically couples adjacent fiber sections so that a beam generated by the laser source 202 propagates through the optical fiber splice and increases the beam parameter product of the generated beam by a selected, or close to a selected, amount associated with the fiber laser beam output 212. The selected increase in beam parameter product is caused by a non-zero angle between fiber-spliced adjacent fiber sections. As the beam generated by the laser source 202 propagates through the splice, the non-zero angle causes the beam to fill additional transverse modes in the downstream fiber section. Suitable locations for the beam parameter product increasing optical fiber splice include one or more of the cladding light stripper 204, delivery fiber 206, and connecting passive sections 208, 210. In some examples, the beam parameter product increasing optical fiber splice can be situated before or between fiber gain sections, such as before a fiber oscillator or before a fiber amplifier, or after a final oscillator or amplifier fiber. The increase in bpp can be associated with the improved filling of modes of a downstream gain fiber.

Figures 4, 5:
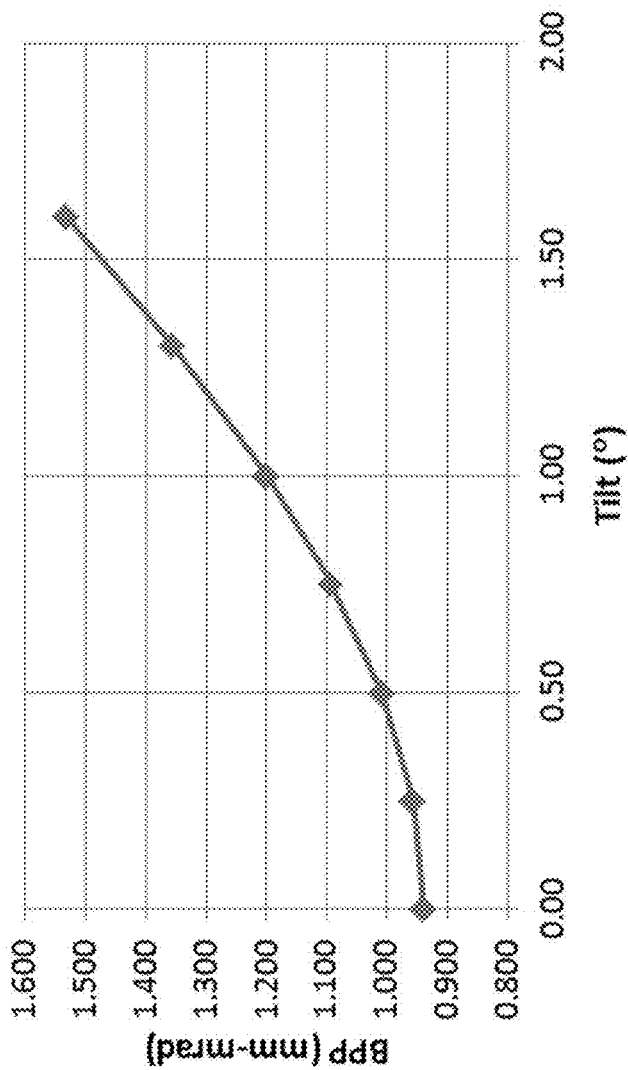
FIG. 4 is a graph of beam parameter product with respect to tilt angle.
FIG. 5 is a table of beam parameter values related to the graph in FIG. 4.
Figure 6A:
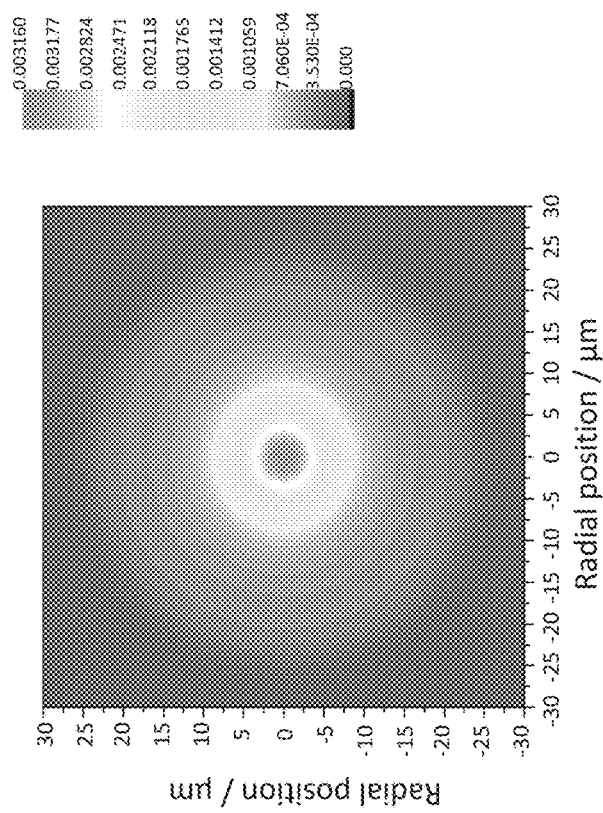
FIG. 6A illustrates an intensity profile associated with a zero angle splice.
Figure 6B:
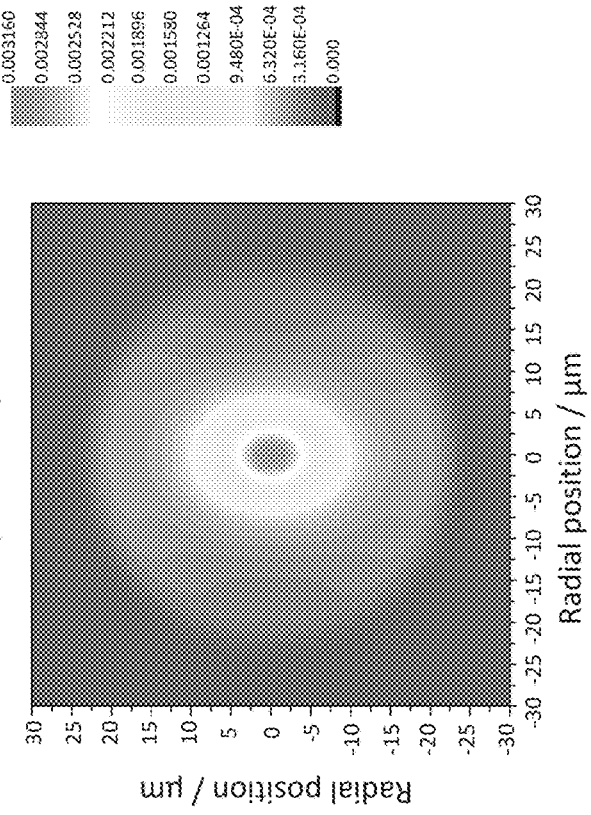
FIG. 6B illustrates an intensity profile associated with a non-zero angle splice.

FIG. 4 is a chart showing simulation results predicting the increase in beam parameter product for a single-mode beam propagating through a 14 μm diameter core propagating through a fiber splice with respective fiber sections tilted at an angle during the splice. From a baseline beam parameter product of about 0.95 mm-mrad, the beam parameter product increases smoothly with increasing tilt angle. FIG. 5 is a table corresponding to the chart in FIG. 4 showing predicted increases in various beam features as tilt angle associated with the fiber splice is increased. In general, relatively small angles, ranging from about 0.5 degrees to 5 degrees achieve suitable ranges of increase in beam parameter product. FIG. 6A shows the intensity profile of a resulting output beam after a corresponding input beam has propagated through a fiber splice, where the fiber sections that were spliced were arranged end to end at a zero angle. FIG. 6B shows the intensity profile of a resulting output beam after a corresponding input beam has propagated through a fiber splice, where the fiber sections that were spliced were arranged at an angle of 1.0 degrees.

Figures 7, 8:
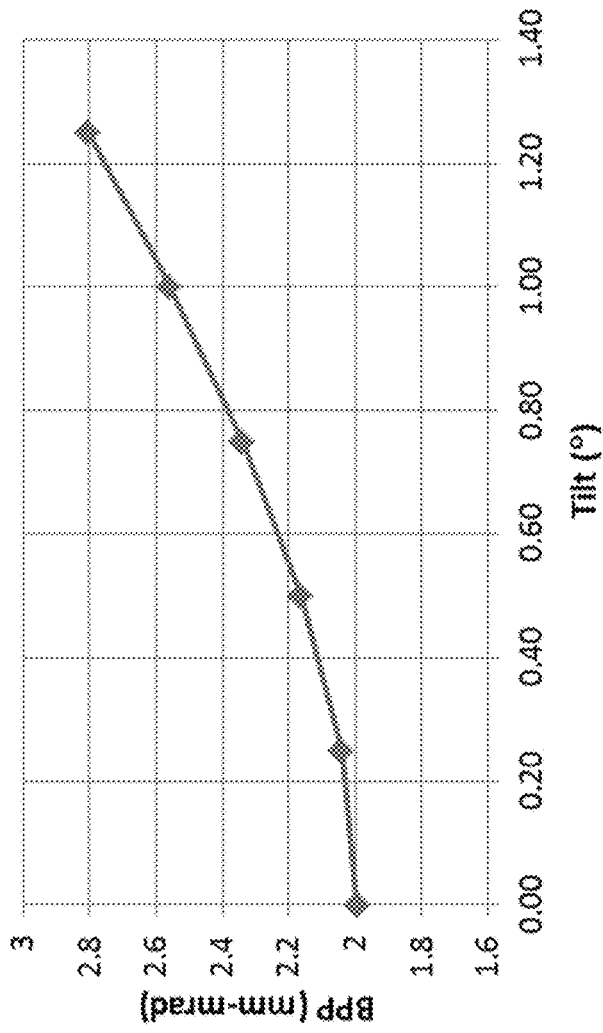
FIG. 7 is another graph of beam parameter product with respect to tilt angle.
FIG. 8 is a table of values related to the graph in FIG. 7.
Figure 9A:
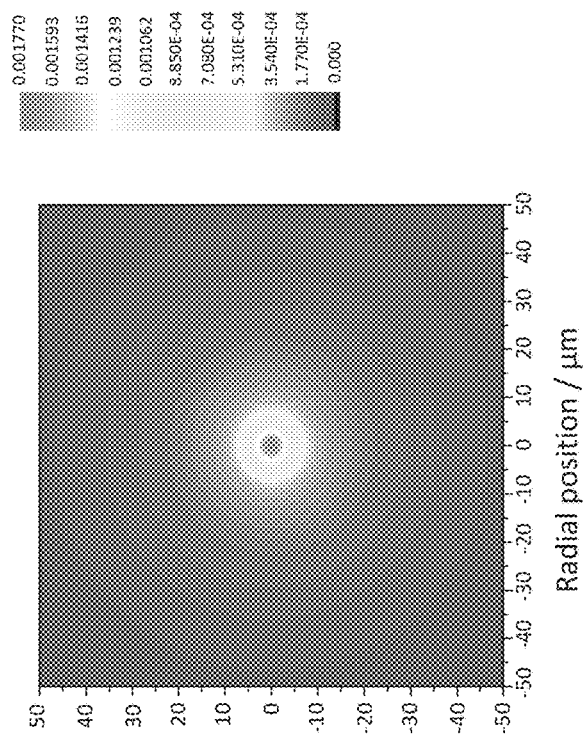
FIG. 9A illustrates an intensity profile associated with a zero angle splice.
Figure 9B:
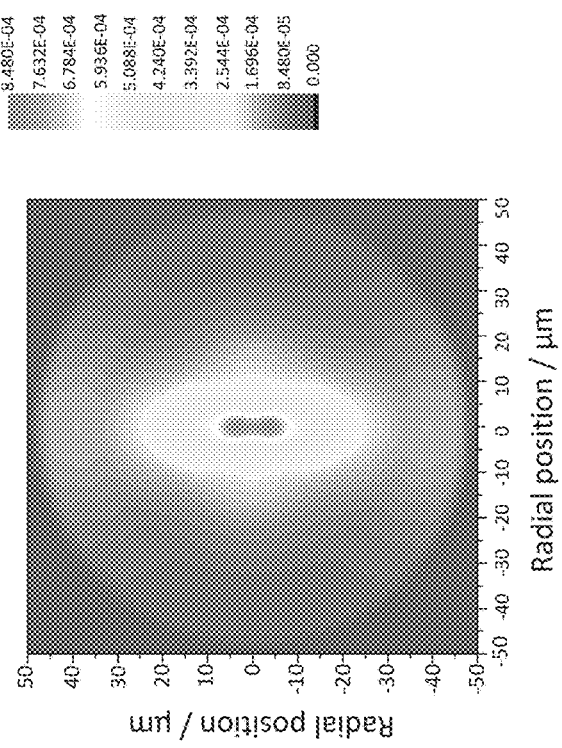
FIG. 9B illustrates an intensity profile associated with a non-zero angle splice.

FIG. 7 is a chart showing simulation results predicting the increase in beam parameter product for a multimode beam propagating in a 40 μm diameter core and propagating through a fiber splice with respective fiber sections tilted at an angle during the splice. A baseline beam parameter product of about 2.0 mm-mrad steadily increases at the tilt angle associated with the spliced fiber ends increases. FIG. 8 is a table corresponding to the chart in FIG. 7 showing predicted increases in various beam features along perpendicular x and y axes perpendicular to the direction of propagation, including spot size Wx, Wy, beam quality Mx2, My2, beam parameter product BPPx, BPPy, BPPr (an average of x and y), as tilt angle increases. FIG. 9A shows the intensity profile of a resulting output beam after a corresponding input beam has propagated through a fiber splice, where the fiber sections that were spliced were arranged end to end at a zero angle. FIG. 9B shows the intensity profile of a resulting output beam after a corresponding input beam has propagated through a fiber splice, where the fiber sections that were spliced were arranged at an angle of 1.0 degrees.

Figure 10:
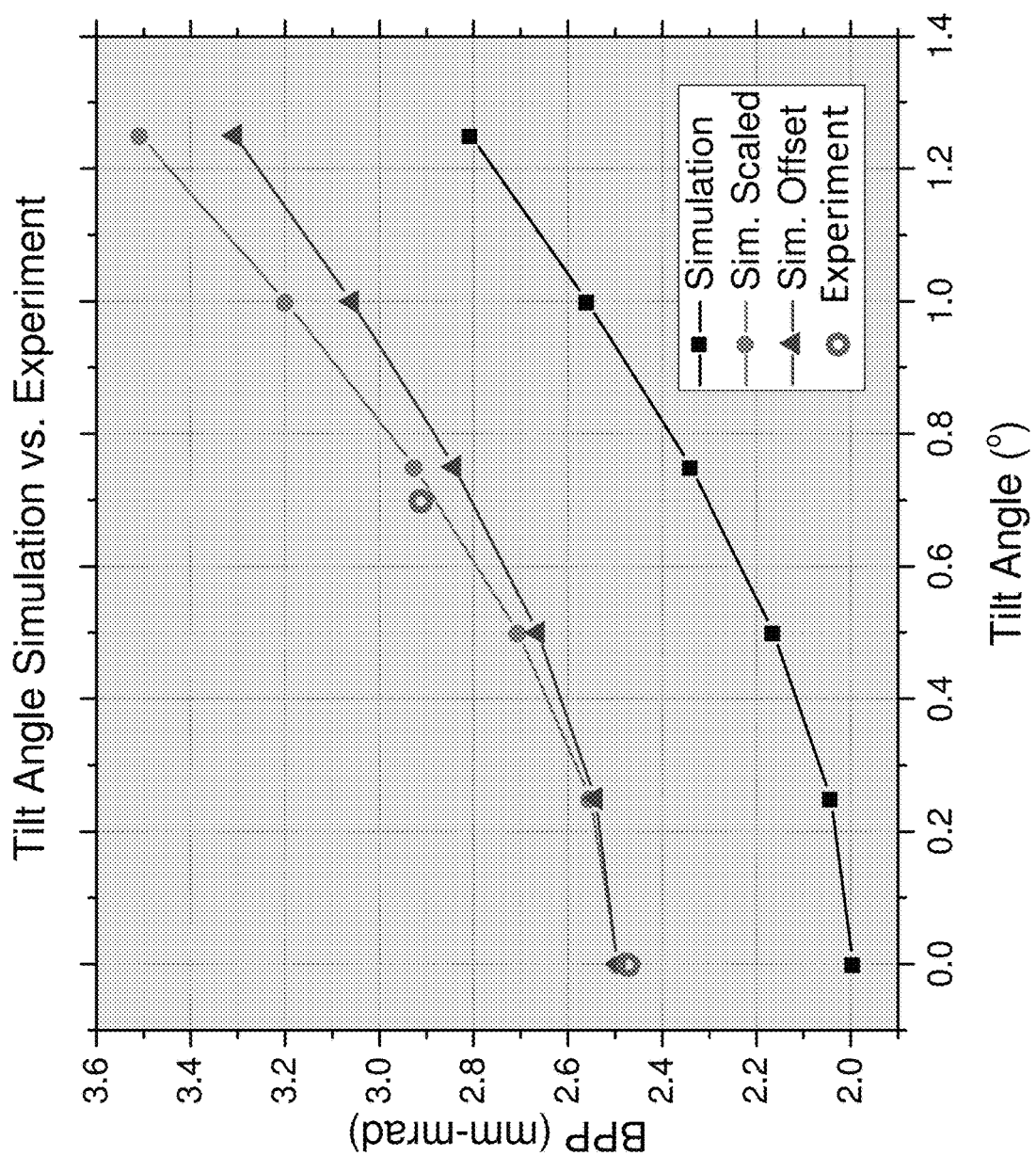
FIG. 10 is a graph of bpp as a function of tilt angle.
Figure 11:
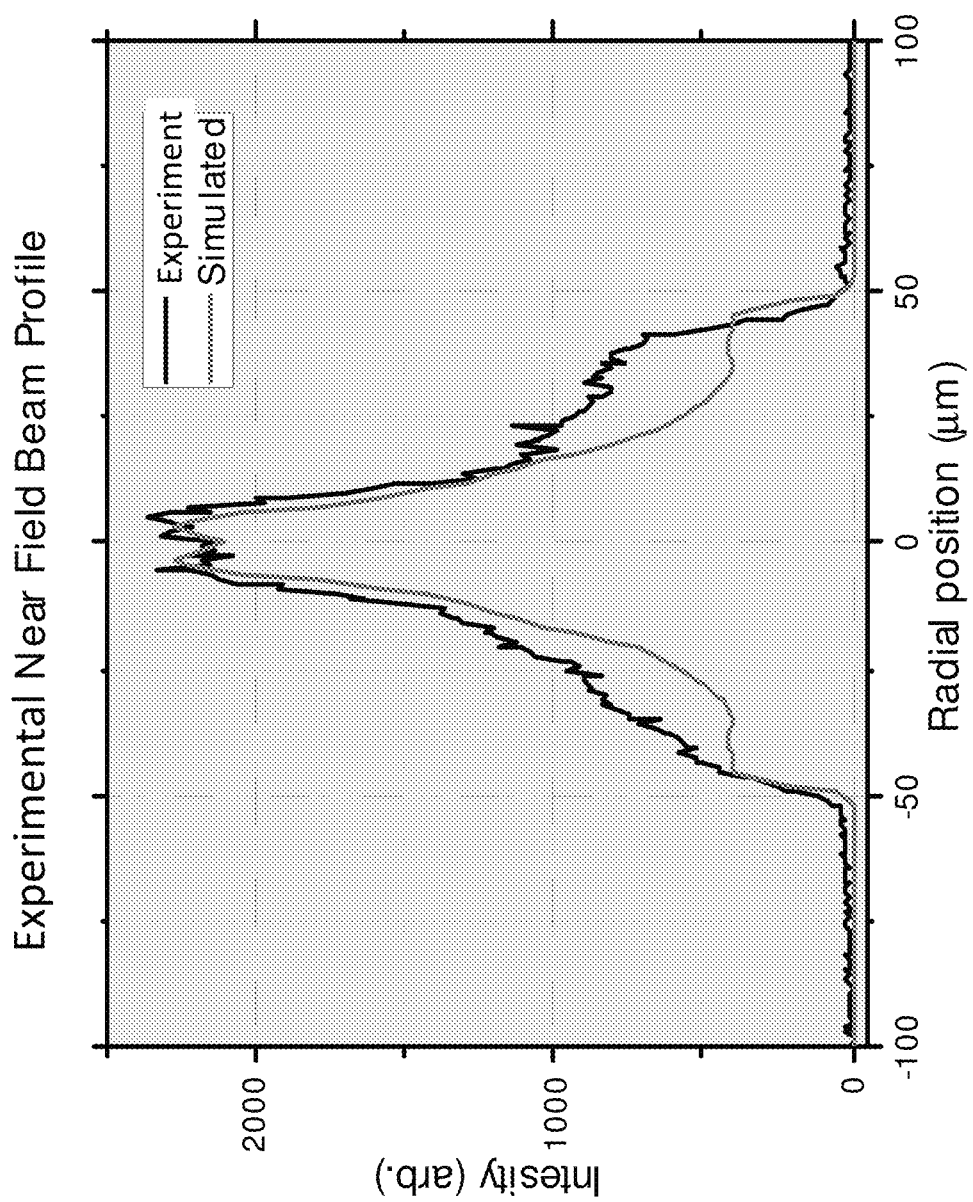
FIG. 11 illustrates an intensity profile for a beam transmitted through a splice with a non-zero tilt angle.
Figure 12:
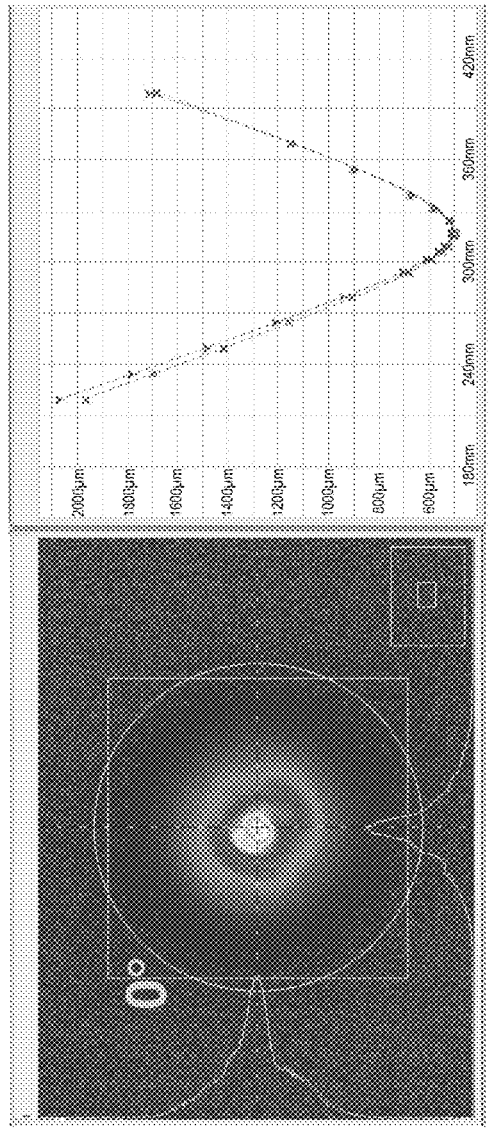
FIG. 12 illustrates an intensity profile of a beam that has propagated through a zero angle splice.
Figure 13:
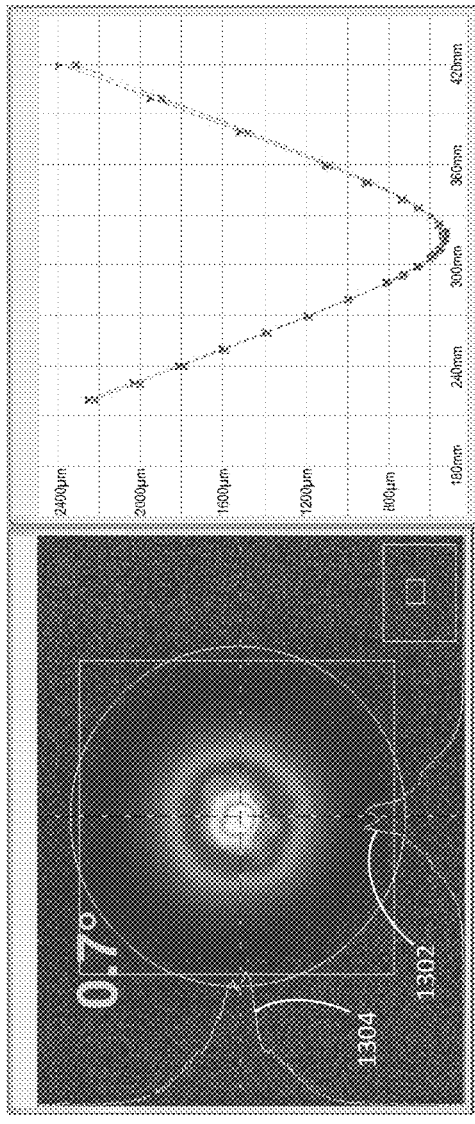
FIG. 13 illustrates an intensity profile of a beam that has propagated through a non-zero angle splice.

FIG. 10 shows simulated data of beam parameter product as a function of tilt angle along with experimental results associated with fiber splices at 0.0 degrees and 0.7 degrees. FIG. 11 shows simulated and experimental results for the intensity profile of the multi-kW beams associated with the beam parameter product results in FIG. 10 for the fiber splice having 0.7 degree tilt angle. FIG. 12 shows beam output results for a 0.0 degree fiber splice tilt angle (i.e., no tilt) and FIG. 13 shows beam output results for a 0.7 degree fiber splice tilt angle. As shown in the side graphs 1302, 1304 corresponding to the intensity profiles across perpendicular axes of the beam, a flat middle portion with small center depression is established with the increased tilt angle. Thus, the mode field distribution of the beam propagating in the receiving fiber of a spliced fiber pair changes from Gaussian (or another initial distribution) to other shapes, such as flat-top, ring-shaped, or another shape, based on the increase in splice tilt angle.

Figure 14:
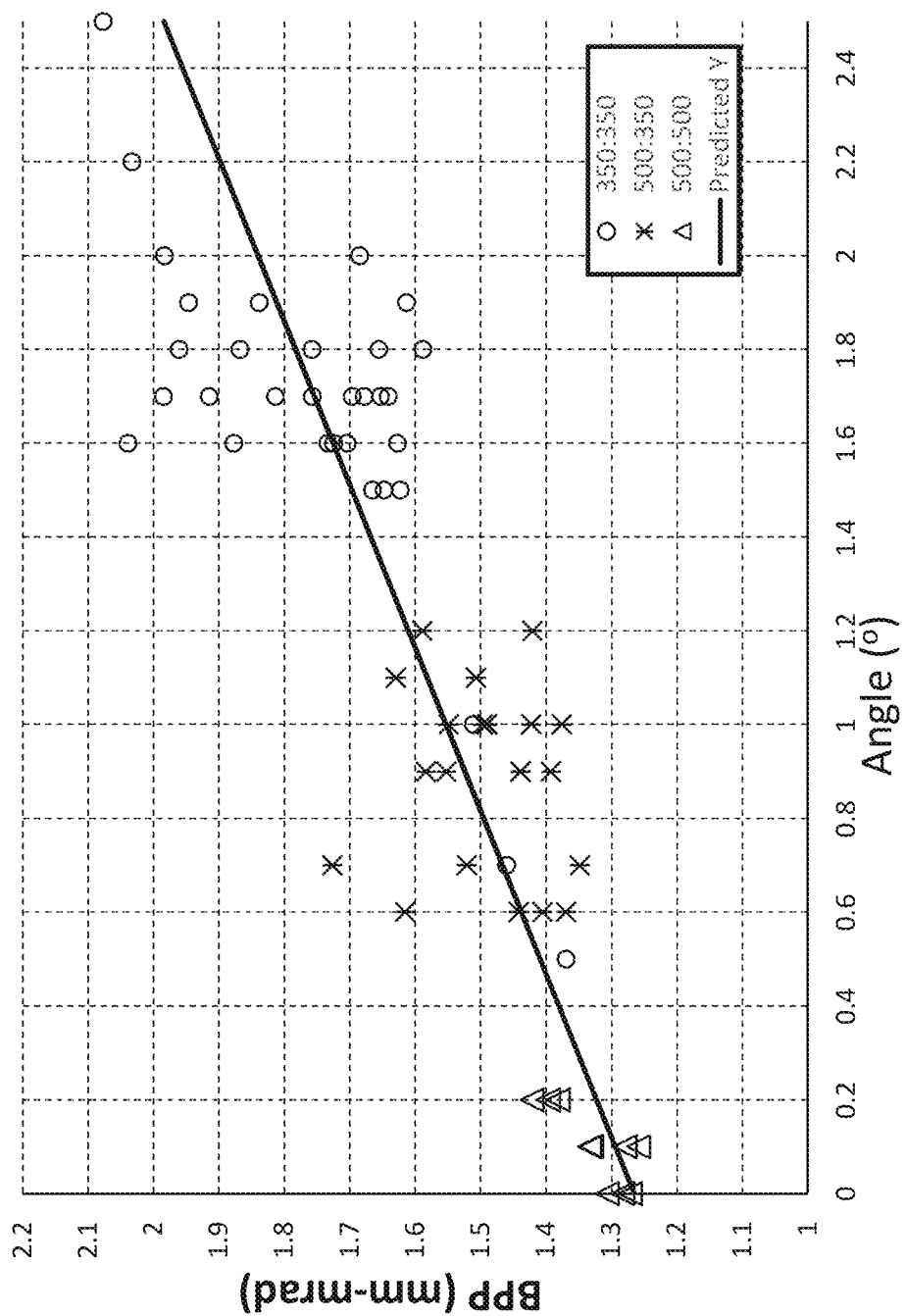
FIG. 14 is a graph of bpp with respect to tilt angle for several splice samples.

FIG. 14 shows a graph 1400 depicting the relationship between bpp increase and tilt angle for several samples of splices of fibers with equal 500 μm outer diameters that were spliced with the same Fitel fusion splicer. In a first group of samples 1402, a fusion splicer clamp fixture having a v-groove designed to receive a 500 μm fiber is used for the first fiber and for the second fiber. The corresponding splice samples show a very low angle between the two fibers of about 0.2° or less, showing effectively a zero tilt angle between first and second fibers. In general, the tilt angle between the fibers was very low, typically 0.2° degrees or less, which is similar to the angle tolerance achieved in conventional splices. In a second group of samples 1404, a 500 μm fusion splicer clamp fixture having a v-groove designed to receive 500 μm fiber was used for one fiber in each splice and a 350 μm fusion splicer clamp fixture having a v-groove designed to receive a 350 μm fiber was used for the other fiber in each splice. For example, v-groove depth, width, cross-section, can be adjusted to correspond to fibers of different diameters. The corresponding results show the presence of a tilt angle, ranging from about 0.6° to 1.2°, between the longitudinal axes of the spliced fibers after fusion splicing. The increase in angle can be attributed to a longitudinal axis offset between the second fiber and the first fiber (or splicer electrodes) provided by the 350 μm fusion splicer clamp fixture. A third group of samples 1406 includes splices formed by positioning both 500 μm fibers in undersized 350 μm fusion splicer clamp fixtures. Both fibers became offset in relation to the splicer electrodes so that during alignment of the fibers and prior to the splice, the fiber tips were angled towards the electrodes. The resulting splice includes a range of tilt angles that were concentrated between about 1.5° to 2.0°.

FIG. 15 shows an example method 1500 for increasing a beam bpp by a selected amount or into a range of bpp increases. At 1502, a bpp increase amount is selected for a beam that propagates from a first fiber to a second fiber. At 1504, a tilt angle between the first fiber and the second is selected that is based on the selected bpp increase. In typical examples, tilt angles can correspond to an angle between longitudinal axes or end faces of the first and second fibers. At 1506, the end faces of the first and second fibers are coupled, for example, with a fusion splice, so as to form the tilt angle selected at 1504 and to produce a bpp increase for the beam that corresponds to the bpp increase selected at 1502. Tilt angles are typically selected in the range of 0.2° to 5°, and more typically from about 0.5° to about 1.5°. In FIG. 16, a method 1600 is shown that includes, at 1602, selected a bpp increase that is associated with a laser beam propagating from a first fiber to a second fiber. At 1604, one of the first and second fibers is positioned so that a longitudinal axis of the respective fiber is provided with an offset from one or both of a longitudinal axis of the other fiber and a splice position where the ends of the first and second fibers are to be spliced. At 1606, the first and second fibers are spliced together. In representative examples, the offset provides a tilt angle between the longitudinal axes of the first and second fibers during the splicing at 1606.

FIGS. 17A-17B show an example fusion splicing apparatus 1700 that can produce fiber splices with selectable bpp increases. The fusion splicing apparatus 1700 generally includes an outer fiber fixture portion 1702 having a fiber receiving portion 1704 situated to receive a first fiber 1706 with a predetermined fiber geometry and an outer fiber fixture portion 1708 having a fiber receiving portion 1710 situated to receive a second fiber 1712 with a predetermined fiber geometry. For example, the predetermined fiber geometry associated with outer fiber fixture portions 1702, 1708 can be a fiber cross-sectional area or outer diameter. As shown, the cross-sectional area of the first fiber 1706 is the same as that of the second fiber 1712. Typical fiber cross-sectional areas can be associated with cladding diameters of 60 μm, 80 μm, 100 μm, 200 μm, 350 μm, 500 μm, 660 μm, or smaller or larger or having intermediate values in some examples. Fiber cross-sectional areas can also be defined with respect to a core, inner cladding, outer cladding, buffer jacketing, or other fiber layers. Fiber cores can range from single mode, to few-mode, to multimode, including 6 μm, 10 μm, 15 μm, 25 μm, 50 μm, 100 μm, and 220 μm, or larger core diameters in some examples.

The fiber receiving portion 1704 of the outer fiber fixture portion 1702 is matched to the cross-sectional area or outer diameter of the first fiber 1706 so that a longitudinal axis 1714 of the first fiber 1706 secured in the outer fiber fixture portion 1702 is aligned with a splicer energy source 1716, such as an electrode, of a fiber splicer mechanism 1718. The longitudinal axis 1714 typically corresponds to a center axis of a fiber core 1720 that can be offset with respect to a cladding but is more typically centrally positioned in the fiber cross-section. The fiber receiving portion 1710 of the outer fiber fixture portion 1708 is not matched to the outer cladding diameter of the second fiber 1712 so that a longitudinal axis 1722 of the second fiber 1712, typically centered about a fiber core 1724, becomes shifted by an offset H above the longitudinal axis 1714 and the splicer energy source 1716 with the second fiber 1712 secured in the outer fiber fixture portion 1708. In some examples, the height offset H can be produced by selecting the outer fiber fixture portion 1708 to correspond to a fiber cross-sectional area or outer diameter that is smaller than the cross-sectional area or outer diameter of the second fiber 1712. In further examples, a translation stage can be used to move the second fiber 1712 or the outer fiber fixture portion 1708 to produce the height offset H. It will be appreciated that the term is used for convenience and other designations, and the offset can be associated with a length, width, distance, dimension, shift, etc.

With additional reference to FIG. 17B, z-axis translation stages 1726, 1728 are coupled to the outer fiber fixture portions 1702, 1708 so that an end 1730 of the first fiber 1706 and an end 1732 of the second fiber 1712 can be moved proximate each other. In some examples, the ends are brought in contact, partial contact, or within ⅒, ¼, ½, or one core radius of one of the cores 1720, 1724 and generally centered in relation to the splicer energy source 1716. Proximity and alignment precision can be in the range of under a 1 μm to several μm. A fiber tip alignment mechanism can include an X, Y, or XY translatable inner fiber fixture portions 1734a, 1734b that are coupled to the ends 1730, 1732 and situated proximate the splicer energy source 1716 so that the fiber cores 1720, 1724 can be moved in relation to the other and brought in alignment. An alignment assistance mechanism 1736a, 1736b can assist with the alignment of the fiber ends 1730, 1732 by coupling light into one or both of the first fiber 1706 and the second fiber 1712 and detecting an amount of light received by the receiving fiber. The alignment assistance mechanism 1736a, 1736b can also include one or more cameras allowing a magnified view of the fiber ends 1730, 1732. The alignment assistance mechanism can be automated or manually controlled with a splice control 1738. The splice control 1738 and a power source 1740 are coupled to the fiber splicer mechanism 1718 so as to provide energy for the splicer energy source 1716 and to control the splice characteristics of the splice produced with the fiber ends 1730, 1732. Because the longitudinal axis 1722 is provided with the offset H, the fiber ends 1730, 1732 are aligned with the inner fiber fixture portions 1734a, 1734b so that the longitudinal axes 1714, 1722 form a tilt angle θ at the fiber ends 1730, 1732. The inner fiber fixture portions 1734 can include spring loaded v-grooves in which the fiber ends 1730, 1732 can be inserted and secured. With the fiber end 1732 secured as shown in FIG. 17B with the inner fiber fixture portion 1734b urging the fiber end 1732 downward, the offset H and the distance between the inner and outer fiber fixture portions 1708, 1734b can determine the amount of tilt in the tilt angle θ. A tilt angle, such as the tilt angle θ, can be provided for the first fiber 1706 so as to combine with the tilt angle θ for the second fiber 1712 to produce a corresponding splice tilt of 2θ.

The tilt angle θ can be selected by varying the offset H or the distance between one or both of the outer fiber fixture portions 1702, 1708, the inner fiber fixture portions 1734a, 1734b, and the splice location of the fiber ends 1730, 1732, or both the offset H and the distance or distances. In one example, both of the longitudinal axes 1714, 1722 are raised so as to be offset from the splice location. The fiber tip alignment mechanism then repositions the ends 1730, 1732 so that a resulting splice has an increased tilt angle θ. The bpp of a beam that propagates from the first fiber 1706 to the second fiber 1712 is increased by an amount that corresponds to the selected tilt angle θ or the selected offset H. For example, where a first bpp of a beam that propagates through an untilted splice increases to a second bpp, the first bpp of the beam after propagating through a tilted splice increases to a third bpp greater than the second bpp. Alternatively, where a first bpp of a beam that propagates through an untilted splice remains the same, after propagation through the tilted splice, the first bpp increases to a second bpp. As tilt angle θ increases, fiber splices can become more susceptible to break, burn, or other failure, though in some examples, splice samples with tilt angles of greater than 0.2° and less than 1.5° did not produce a significant percentage of failures with propagating beams with continuous powers of 800 W to 4 kW. The first fiber 1706 and the second fiber 1712 can have various core and cladding diameters. In some examples, for beams propagating from the first fiber to the second fiber, the diameter of the core 1724 is typically larger than or the same size as the core 1720. Cladding diameters can vary, and in some examples, an outer cladding diameter of the first fiber 1706 can be larger than, the same size, or smaller than the outer cladding diameter of the second fiber 1712. In some examples, the increase in bpp does not occur immediately at the splice but instead at a distance, such as several cm, downstream from the splice.

FIG. 18 shows a side cross-section of a fiber fixture 1800 that includes top and bottom portions 1802, 1804 including a v-groove 1806 in the bottom portion 1804. A fiber 1808 associated with the dimensions of the v-groove 1806 is situated in the v-groove 1806 so that a center position of a fiber core 1810 is situated at a reference plane 1812. With a different fiber 1814 that has an outer diameter that is oversized for the v-groove 1806, a fiber core 1816 of the different fiber 1814 is elevated so as to be positioned at a reference plane 1818 spaced apart from the reference plane 1812. In some examples, V-groove geometry is varied for different fixtures to correspond to fibers with different outer diameters or to correspond with positioning a reference axis of the fiber 1808 at different reference planes. In further examples, V-groove geometry can remain fixed and fixture thickness can be varied for different outer diameters or to provide a fiber with different offsets. For example, the bottom portion 1804 can have a larger thickness to correspond to a fiber with a smaller outer diameter or to reposition a fiber reference axis at a higher reference plane, such as reference plane 1818. In different examples, V-groove geometry, such as depth, width, V-slope, curved or linear sides, etc. can be varied. Thus, in some examples, custom fixtures can be fabricated to provide different offsets for fibers to be spliced. In additional embodiments, a movement stage is coupled to the fixture, such as the bottom portion 1804 of the fiber fixture 1800, to raise, lower, provide lateral movement, or fiber rotation.

FIG. 19 shows an example fiber arrangement 1900 of a first fiber 1902 and a second fiber 1904 secured in respective fiber fixtures 1906, 1908. The first fiber 1902 includes an angle-cleaved end 1910 tilted with respect to a core axis 1912 of the first fiber 1902 by an angle 90−θ. The core axis 1912 of the first fiber 1902 is aligned so as to be collinear with a core axis 1914 of the second fiber 1904. The angle-cleaved end 1910 is brought proximate a cleaved end 1916 of the second fiber 1904 that extends perpendicularly with respect to the core axis 1914. A splicing mechanism 1918, such as a pair of electrodes, is situated to fusion splice the angle-cleaved end 1910 and the cleaved end 1916 together so as to form a splice that produces a bpp increase for a beam propagating from one of the fibers to the other one of the fibers based on the tilt angle θ. In some examples, both the first fiber 1902 and the second fiber 1904 can have angle-cleaved ends, and the longitudinal axes 1912, 1914 can be rotated relative to each other to define a tilt angle at the splice that varies based on the rotation.

In FIG. 20, a first fiber 2002 is secured in a fiber fixture 2004 that is situates an angle-cleaved end 2006 of the first fiber 2002 and a core axis 2008 of the first fiber 2002 in a splice position adjacent a splicing mechanism 2010. The angle-cleaved end 2006 is at an angle $\theta_1$ with respect to a plane perpendicular to the core axis 2008. A second fiber 2012 is secured in a corresponding fiber fixture 2014 so that a core axis 2016 of the second fiber 2012 extends at a tilt angle θ2 with respect to the core axis 2008 and approximately intersects the core axis 2008 of the first fiber 2002 at the angled-cleaved end 2006. The tilt angle θ2 can be the same as the angle $\theta_1$ so that the angle-cleaved end 2006 is parallel and proximate a cleaved end 2018 of the second fiber 2012 at the splice position.

FIG. 21 shows another example splice arrangement 2100 of a first fiber 2102 and a second fiber 2104 secured in respective fixtures 2106, 2108 so that respective longitudinal axes 2110, 2112 are angled at a tilt angle θ and intersect at a splice position of a splicer mechanism energy source 2114. The first fiber 2102 and second fiber 2104 include respective cleaved ends 2116, 2118 that are perpendicular to the respective longitudinal axes 2110, 2112. A fusion splice joining the cleaved ends 2116, 2118 provides a tilt angle between the first fiber 2102 and the second fiber 2104 that produces an increase in a bpp for a beam propagating from one of the fibers to the other one of the fibers.

Having described and illustrated the principles of the disclosed technology with reference to the illustrated embodiments, it will be recognized that the illustrated embodiments can be modified in arrangement and detail without departing from such principles. For instance, elements of the illustrated embodiments, such as splice tilt angle control, tilt angle and bpp selection, etc., can be implemented in software or in hardware of a fusion splicing apparatus or a controller or computer coupled to the fusion splicing apparatus. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope and spirit of the appended claims.

We claim:

1. An apparatus, comprising:
a fiber fixture situated to receive and secure an output end of a first fiber in a first position and a second fiber in a second position;
a fiber tip alignment mechanism situated to align an input end of the first fiber proximate an output end of the second fiber, the fiber tip alignment mechanism comprising a first inner fiber fixture portion and a second inner fiber fixture portion, the first and second inner fiber fixture portions being translatable in one or more directions; and
a splicing mechanism situated to splice the aligned input end and output end so as to form a fiber splice having a selected tilt angle corresponding to a selected beam parameter product (bpp) increase associated with beam propagation through the fiber splice from the first fiber to the second fiber.

2. The apparatus of claim 1, wherein the splicing mechanism is a fusion splicing mechanism.

3. The apparatus of claim 1, wherein the first position and second position correspond to an offset between one or more of a longitudinal axis of the first fiber, a longitudinal axis of the second fiber, and a splice position associated with the splicing mechanism.

4. The apparatus of claim 1, wherein the selected tilt angle corresponds to an angle between a longitudinal axis of the first fiber at the splice and a longitudinal axis of the second fiber at the splice.

5. The apparatus of claim 1, wherein the selected tilt angle corresponds to a first angle between an output surface at the output end of the first fiber and a plane perpendicular to a longitudinal axis of the first fiber at the output end, a second angle between an input surface at the input end of the second fiber and a plane perpendicular to a longitudinal axis of the second fiber at the input end, or a combination of the first angle and the second angle, at the aligned input and output ends.

6. The apparatus of claim 1, wherein the fiber fixture comprises a first outer fiber fixture portion configured to receive and secure the output end of the first fiber and a second outer fiber fixture portion configured to receive and secure a first end of the second fiber.

7. The apparatus of claim 6, wherein the first outer fiber fixture has a longitudinal axis extending through the first outer fiber fixture that is offset by a selected height from a longitudinal axis extending through the second outer fiber fixture.

8. An apparatus, comprising:
a fiber fixture situated to receive and secure an output end of a first fiber in a first position and a second fiber in a second position, the fiber fixture comprising a first outer fiber fixture portion configured to receive and secure the output end of the first fiber and a second outer fiber fixture portion configured to receive and secure a first end of the second fiber;
a fiber tip alignment mechanism situated to align an input end of the first fiber proximate an output end of the second fiber;
a splicing mechanism situated to splice the aligned input end and output end so as to form a fiber splice having a selected tilt angle corresponding to a selected beam parameter product (bpp) increase associated with beam propagation through the fiber splice from the first fiber to the second fiber; and a translation stage configured to move the second outer fiber fixture relative to the first outer fiber fixture to create a selected height offset between a longitudinal axis extending through the second outer fiber fixture and a longitudinal axis extending through the first outer fiber fixture.

9. The apparatus of claim 8, wherein the translation stage is a first translation stage and wherein the apparatus further comprises one or more additional translation stages configured to move the first and second fibers toward and away from one another.

10. The apparatus of claim 1, wherein the first and second inner fiber fixture portions are translatable along a first axis and a second axis perpendicular to the first axis.

11. The apparatus of claim 1, wherein the first and second inner fiber fixture portions each comprise a spring loaded v-groove.

12. The apparatus of claim 1, wherein the fiber tip alignment mechanism further comprises one or more cameras configured to provide a magnified view of the first and second fibers.

13. A splicing apparatus for coupling a first optical fiber having a first longitudinal axis to a second optical fiber having a second longitudinal axis, comprising:

a first fiber fixture portion configured to secure a first end portion of the first optical fiber such that the first longitudinal axis is disposed at a first height;

a second fiber fixture portion configured to secure a first end portion of the second optical fiber such that the second longitudinal axis is disposed at a second height;

a translation stage coupled to at least one of the first fiber fixture portion and the second fiber fixture portion, the translation stage being configured to move the first end portion of the first optical fiber relative to the first end portion of the second optical fiber thereby permitting selection of a tilt angle between the first longitudinal axis and the second longitudinal axis prior to splicing the first end portion of the first optical fiber to the first end portion of the second optical fiber; and a fiber tip alignment mechanism including a first inner fiber fixture portion configured to secure an output end of the first optical fiber and a second inner fiber fixture portion configured to secure an input end of the second optical fiber, the first and second inner fiber fixture portions being translatable along a first axis and along a second axis perpendicular to the first axis.

14. The splicing apparatus of claim 13, wherein the first height is offset from the second height by a selected height offset.

15. The splicing apparatus of claim 13, wherein the translation stage is a first translation stage and wherein the splicing apparatus further comprises one or more additional translation stages coupled to at least one of the first and second fiber fixture portions, the one or more additional translation stages being configured to move the first and second fibers toward and away from one another.

16. The splicing apparatus of claim 13, wherein the first and second inner fiber fixture portions each comprise a spring loaded v-groove.

17. The splicing apparatus of claim 13, wherein the fiber tip alignment mechanism further comprises one or more cameras configured to provide a magnified view of the output end of the first optical fiber and the input end of the second optical fiber.

18. The splicing apparatus of claim 13, wherein the first and second inner fiber fixture portions are translatable along the first axis toward and away from the first and second fiber fixture portions respectively, and wherein the distance between the inner fiber fixture portions and the fiber fixture portions determines the selected tilt angle.

19. The apparatus of claim 6, further comprising a translation stage configured to move the second outer fiber fixture relative to the first outer fiber fixture to create a selected height offset between a longitudinal axis extending through the second outer fiber fixture and a longitudinal axis extending through the first outer fiber fixture.

20. The apparatus of claim 19, wherein the translation stage is a first translation stage and wherein the apparatus further comprises one or more additional translation stages configured to move the first and second fibers toward and away from one another.

* * * * *